United States Patent
Ford et al.

(10) Patent No.: US 11,926,708 B1
(45) Date of Patent: Mar. 12, 2024

(54) FLUOROSILICONE COMPOSITIONS AND METHODS RELATED THERETO

(71) Applicant: NUSIL TECHNOLOGY LLC, Carpinteria, CA (US)

(72) Inventors: Kyle Brian Ford, Carpinteria, CA (US); James Ramies, Carpinteria, CA (US)

(73) Assignee: Nusil Technology LLC, Carpinteria, CA (US)

(*) Notice: Subject to any disclaimer, the term of this patent is extended or adjusted under 35 U.S.C. 154(b) by 78 days.

(21) Appl. No.: 17/716,128

(22) Filed: Apr. 8, 2022

Related U.S. Application Data

(60) Provisional application No. 63/172,213, filed on Apr. 8, 2021.

(51) Int. Cl.
*C08G 77/24* (2006.01)
*C08K 3/04* (2006.01)
*C08K 3/36* (2006.01)

(52) U.S. Cl.
CPC ............. *C08G 77/24* (2013.01); *C08K 3/04* (2013.01); *C08K 3/36* (2013.01)

(58) Field of Classification Search
CPC ............. C08G 77/24; C08K 3/04; C08K 3/36
See application file for complete search history.

(56) References Cited

U.S. PATENT DOCUMENTS

| | | | |
|---|---|---|---|
| 3,629,106 A | 12/1971 | Quaal et al. | |
| 4,265,800 A | 5/1981 | Newton | |
| 5,236,997 A * | 8/1993 | Fujiki | C08L 83/14 528/42 |
| 6,037,092 A | 3/2000 | Heeks et al. | |
| 6,297,302 B1 | 10/2001 | Heeks et al. | |
| 6,336,026 B1 | 1/2002 | Heeks et al. | |
| 8,580,873 B2 * | 11/2013 | Hyman | C08L 31/04 524/427 |
| 2017/0002201 A1 | 1/2017 | von Malotki | |

FOREIGN PATENT DOCUMENTS

| | | |
|---|---|---|
| EP | 0427236 B1 | 5/1990 |
| EP | 0427236 B1 | 5/1991 |
| EP | 0522733 B1 | 1/1992 |
| EP | 0667373 A2 | 8/1995 |
| EP | 2886584 A1 | 6/2015 |
| EP | 2995652 A1 | 3/2016 |
| WO | WO 2008/154319 A1 | 12/2008 |

(Continued)

OTHER PUBLICATIONS

Camino, Lomakin, et al., Thermal Degradation of Polystyrene-Polydimethylsiloxane Blends, Polymer, 42 (2001) 2395-2402.

(Continued)

*Primary Examiner* — Ling Siu Choi
*Assistant Examiner* — Andrea Wu
(74) *Attorney, Agent, or Firm* — Ballard Spahr LLP

(57) ABSTRACT

A composition is described herein that includes a fluorosilicone, a silicon-based crosslinker, a reinforcement filler, a curing catalyst, a first non-reactive spacer filler, and a second filler comprising one or more silanol groups. Methods of using such a composition are also described.

19 Claims, 8 Drawing Sheets

(56) References Cited

FOREIGN PATENT DOCUMENTS

WO     WO 2008/154327 A1     12/2008
WO     WO 2016/087500     12/2015

OTHER PUBLICATIONS

Griffith, et al. Closing the Fluoro Elastomers High Temperature Gap: New Developments in Fluorosilicone Rubber White paper, Dow 2018.

Polgar et al., Kinetics of cross-linking and de-cross-linking of EPM rubber with thermoreversible diels-Alder chemistry, European Polymer Journal, vol. 90 (2017) pp. 150-161.

* cited by examiner

FLUOROSILICONE COMPOSITIONS AND METHODS RELATED THERETO

CROSS-REFERENCE TO RELATED APPLICATIONS

This application claims the benefit of U.S. Application No. 63/172,213, filed on Apr. 8, 2021, the contents of which are incorporated herein by reference in their entirety.

FIELD OF INVENTION

This disclosure relates to a composition comprising fluorosilicone having a desired thermal stability at elevated temperatures. The composition comprising fluorosilicone is suitable to be used as coatings, adhesives, and articles exposed to high temperatures. Also disclosed are method of using the disclosed composition comprising fluorosilicone.

BACKGROUND

Fluorosilicone compositions provide excellent resistance to most organic solvents. However, they are also more vulnerable to thermal decomposition than other polysiloxanes. Fluorosilicones are typically limited to a maximum operating temperature of 200° C. or less. With the use of stabilizers, the maximum operating temperature can be increased to 250° C. (Griffith, Ross, Drake & Miller, *Closing the Fluoro Elastomers High Temperature Gap: New Developments in Fluorosilicone Rubber* White paper. Dow 2018). In contrast, polydimethylsiloxane (PDMS), which is not a fluorosilane, is stable up to 350° C. (Camino, Lomakin, et al, Polymer 42 (2001) 2395-2402). This vulnerability the use of limits fluorosilicone compositions as coatings, adhesives, or O-rings in high temperature environments, such as in or near a vehicle engines.

Attempts have been made to improve thermal stability involve the addition of fillers designed to prevent the initiation of thermal degradation. Common filler packages usually include metal oxides and materials that bind radical species. It is also not uncommon to include a filler for pH balancing, since acids and bases are known to promote unzipping of fluorosilicone polymer chains.

WO 2008/154319 discloses such an approach where a fluorosilicone composition with an initial tensile strength >7 MPa and elongation >200%, which do not decrease by more than 25% upon heat aging for 7 days at 225° C. In WO 2008/154319, the thermal decomposition is reduced by the inclusion of a filler package consisting of; iron oxide, carbon black, zinc oxide, and an acid acceptor (calcium carbonate). However, compositions comprising fluorosilicone having thermal stability above 300° C. are desired.

Such a compositions comprising fluorosilicone having thermal stability above 300° C. are disclosed herein and methods related thereto are disclosed herein.

SUMMARY OF THE INVENTION

The compositions disclosed herein degrade at elevated temperatures in a suitable balanced manner to retain suitable tensile strength and elongation. Disclosed herein is a composition comprising:
a) 100 parts by weight of a fluorosilicone;
b) from about 2 to about 20 parts by weight of a silicon-based crosslinker;
c) from about 0.1 to about 40 parts by weight of a first non-reactive spacer filler;
d) from about 0.1 to about 40 parts by weight of a second filler comprising one or more silanol groups; and
e) from about 0.01 to about 5 parts by weight of a curing catalyst.

Also disclosed is a composition comprising:
a) 100 parts by weight of a fluorosilicone;
b) from about 3 to about 10 parts by weight of a silicon-based crosslinker;
c) from about 2 to about 8 parts by weight of a first non-reactive spacer filler;
d) from about 8 to about 14 parts by weight of a second filler comprising one or more silanol groups; and
e) from about 0.03 to about 0.15 parts by weight of a curing catalyst.

Also disclosed is a composition comprising:
a) 100 parts by weight of a fluorosilicone;
b) from about 3 to about 10 parts by weight of a silicon-based crosslinker;
c) from about 2 to about 8 parts by weight of carbon black;
d) from about 8 to about 14 parts by weight of fumed silica; and
e) from about 0.03 to about 0.15 parts by weight of a curing catalyst.

Also disclosed is a composition comprising:
a) 100 parts by weight of a fluorosilicone;
b) from about 2 to about 20 parts by weight of a silicon-based crosslinker;
c) a first amount of a first non-reactive spacer filler;
d) a second amount of a second filler comprising one or more silanol groups; and
e) from about 0.01 to about 5 parts by weight of a curing catalyst, wherein the composition has a tensile strength of at least 200 psi after being exposed to 600° F. in air for 60 minutes.

Also disclosed is a composition comprising:
a) 100 parts by weight of a fluorosilicone;
b) from about 0.1 to about 40 parts by weight of a first non-reactive spacer filler;
c) from about 0.01 to about 5 parts by weight of a curing catalyst; and
d) from about 0.1 to about 20 parts by weight of a silanol resin and/or an untreated silica.

Also disclosed is a composition comprising:
a) 100 parts by weight of a fluorosilicone;
b) from about 0.1 to about 40 parts by weight of a first non-reactive spacer filler;
c) from about 0.03 to about 0.15 parts by weight of a curing catalyst;
d) from about 0.1 to about 20 parts by weight of a silanol resin and/or an untreated silica.
e) from about 3 to about 10 parts by weight of a silicon-based crosslinker; and
f) from about 8 to about 14 parts by weight of a second filler comprising one or more silanol groups.

Also disclosed is a composition comprising:
a) 100 parts by weight of a fluorosilicone;
b) from about 0.1 to about 40 parts by weight of carbon black or a pigment;
c) from about 0.03 to about 0.15 parts by weight of a curing catalyst;
d) from about 0.1 to about 20 parts by weight of a silanol resin and/or an untreated silica;
e) from about 3 to about 10 parts by weight of a silicon-based crosslinker; and
f) from about 8 to about 14 parts by weight of fumed silica.

Also disclosed is a composition comprising:
a) 100 parts by weight of a fluorosilicone;
b) a first amount of a first non-reactive spacer filler;
c) from about 0.01 to about 5 parts by weight of a curing catalyst;
d) a silanol resin and/or an untreated silica;
e) from about 2 to about 20 parts by weight of a silicon-based crosslinker; and
f) a second amount of a second filler comprising one or more silanol groups, wherein the composition has a tensile strength of at least 200 psi after being exposed to 600° F. in air for 60 minutes.

Also disclosed herein is a method comprising the steps of:
a) applying a composition disclosed herein to a surface; and
b) curing the applied composition.

Also disclosed herein is a kit comprising:
a) 100 parts by weight of a fluorosilicone;
b) from about 2 to about 20 parts by weight of a silicon-based crosslinker;
c) from about 0.1 to about 40 parts by weight of a first non-reactive spacer filler;
d) from about 0.1 to about 40 parts by weight of a second filler comprising one or more silanol groups; and
e) from about 0.01 to about 5 parts by weight of a curing catalyst; and
f) a container containing parts a)-e).

Also disclosed herein is a kit comprising:
a) 100 parts by weight of a fluorosilicone;
b) from about 0.1 to about 40 parts by weight of a first non-reactive spacer filler;
c) from about 0.01 to about 5 parts by weight of a curing catalyst;
d) from about 0.1 to about 20 parts by weight of a silanol resin and/or an untreated silica; and
e) a container containing parts a)-e).

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
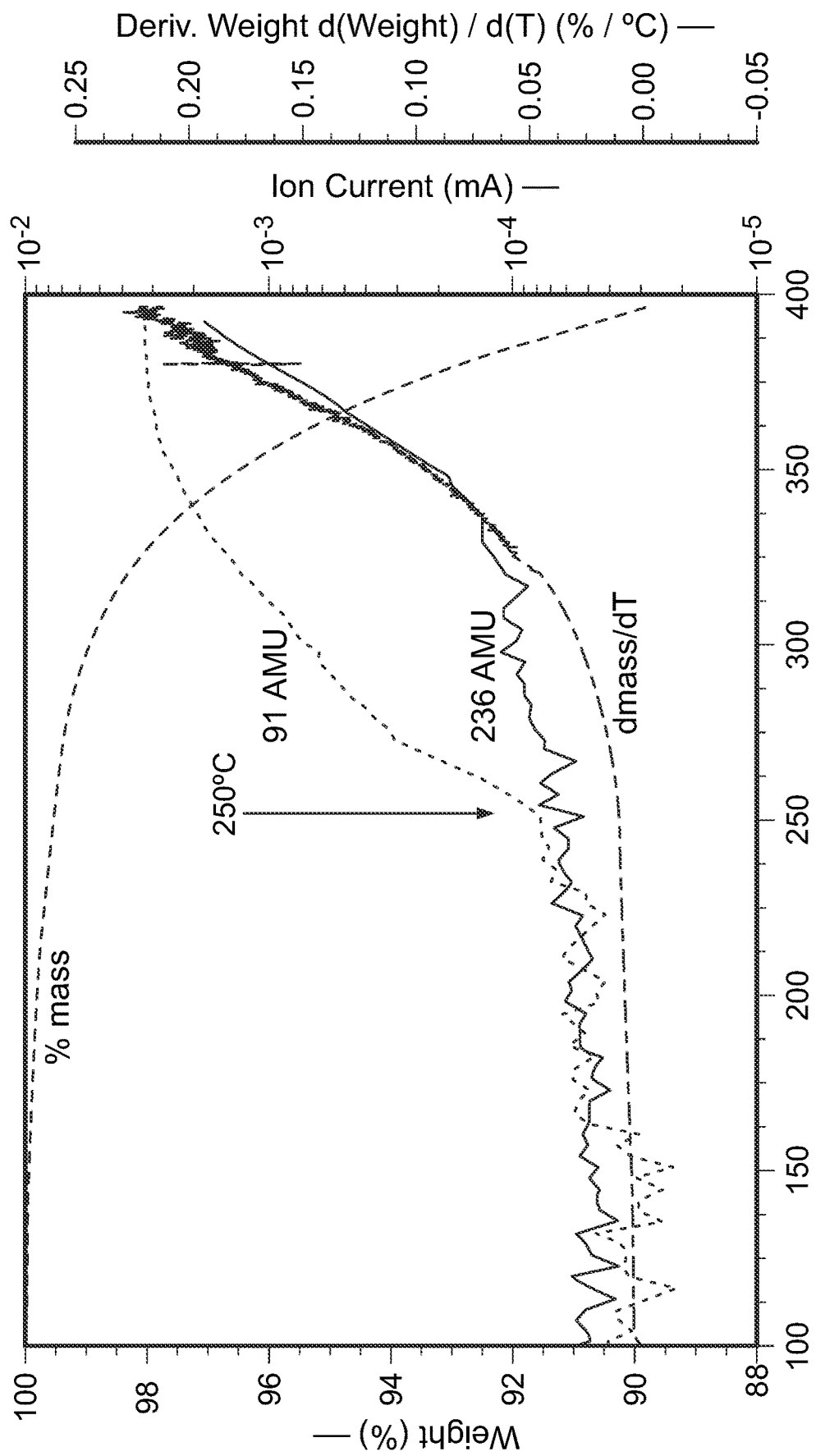
FIG. 1 shows a TGA/MS analysis of FS3-3730.

The present invention can be understood more readily by reference to the following detailed description of the invention and the examples included therein.

Before the present compositions, articles, systems, devices, and/or methods are disclosed and described, it is to be understood that they are not limited to specific methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. Definitions

As used herein, nomenclature for compounds and compositions can be given using common names as well as names assigned by the International Union of Pure and Applied Chemistry (IUPAC) and Chemical Abstracts Service (CAS) recommendations for nomenclature, hereby incorporated herein by reference. One of skill in the art can readily ascertain the structure of a compound and composition if given a name by systemic reduction of the compound structure using naming conventions.

As used in the specification and the appended claims, the singular forms "a," "an," and "the" include plural referents unless the context clearly dictates otherwise.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component denotes the weight relationship between the element or component and any other elements or components or article for which a part by weight is expressed. Thus, in a composition comprising 100 parts by weight of component X and from 9 to 40 parts by weight component Y, X and Y are present at a weight ratio of 100:9-40 or 0.09-0.4, and are present in such ratio regardless of whether additional components are contained in the composition.

Additionally, references in the specification and concluding claims to molar ratios of a particular element or component denotes the molar relationship between the element or component and any other elements or components in the composition or article for which a molar ratio is expressed. Thus, in a composition containing five moles of component X and two moles component Y, X and Y are present at a molar ratio of 5:2 or 5/2 or 2.5 and are present in such ratio regardless of whether additional components are contained in the composition.

A weight percent (wt %) of a component, unless specifically stated to the contrary, is based on total weight of the formulation or composition in which the component is included.

As used herein, the terms "optional" or "optionally" means that a subsequently described event or circumstance can or cannot occur, and that the description includes instances where said event or circumstance occurs and instances where it does not.

As used herein, the terms "treating" or "treated" refer to silica that has been modified (e.g., via chemical modification or heating) to decrease or otherwise remove —OH groups on the silica. For example, the treating can be done chemically to react the —OH groups with molecule that is more hydrophobic than the —OH groups. One example, is chemically modifying the silica with hexamethyldisilazane (HDMS) or (3-aminopropyl)triethoxysilane (APTES), as is known in the art. For example, in various aspects, treated silica has been modified so that at least 30%, at least 40%, at least 50%, at least 60%, at least 70%, at least 80%, at least 90%, at least 95%, or greater than 95% of the —OH groups have been removed. "Highly" treated silica refers to silica in which the majority of —OH groups have been removed, such as, for example, at least 80%, at least 90%, at least 95%, or greater than 95% of the —OH groups have been removed. By treating the silica, the hydrophobicity of the resultant silica is increased. For example, in various aspects, the hydrophobicity is increased by at least 10%, at least 20%, at least 30%, at least 40%, at least 50%, at least 60%, at least 70% or at least 80% relative to untreated silica. As would be understood by one of ordinary skill in the art, treated and highly treated silica can be purchased from a manufacturer per the desired specifications.

As used herein, the term "untreated" refers to silica that has not been modified, for example, via heating to remove —OH groups. In this way, the hydrophilicity of the silica is maintained. As would be understood by one of ordinary skill in the art, untreated silica can be purchased from a manufacturer per the desired specifications.

Disclosed are components to be used to prepare compositions to be used within the methods disclosed herein. These and other compounds are disclosed herein, and it is understood that when combinations, subsets, interactions, groups, etcetera, of these materials are disclosed that while specific reference of each various individual and collective combinations and permutation of these components cannot be explicitly disclosed, each is specifically contemplated and described herein. For example, if a particular silicone composition is disclosed and discussed and a number of modifications that can be made to a number of compounds including the silicone compositions are discussed, specifically contemplated is each and every combination and permutation of the composition and modifications that are possible unless specifically indicated to the contrary. Thus, if a class of compounds A, B, and C are disclosed as well as a class of silicone compositions D, E, and F and an example of a composition, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using silicone compositions. Thus, if there are a variety of additional steps that can be performed, it is understood that each of these additional steps can be performed with any specific embodiment or combination of embodiments of the methods of the invention.

B. Compositions

Fluorosilicone compositions provide excellent resistance to most organic solvents, and is a desired material for many end uses, such as coatings, adhesives, or articles, such as O-rings. The typical operating temperature of conventional fluorosilicones ranges from −95° F. to 410° F. However, higher operating temperatures of fluorosilicones are desired for certain applications, such as applications close to engines or other high temperature environments. The compositions comprising fluorosilicone (a fluorosilicone composition) disclosed herein have a higher thermal stability, as compared to conventional fluorosilicone compositions.

The stability of a fluorosilicone composition can be determined by analyzing the tensile strength and elongation of the materials. Fluorosilicone compositions degrade at elevated temperatures, which impacts the physical properties of the fluorosilicone compositions. For example, it decreases the tensile strength and increases or decreases the elongation properties of the material.

Fluorosilicone compositions degrade at elevated temperatures via at least two different mechanisms: polycondensation and polymer digestion. Polycondensation occurs when a side group is cleaved from the polymer backbone generating an —Si—OH group that becomes available for cross-linking with another —Si—OH group, which also forms water in the process. The polycondensation hardens the fluorosilicone composition and makes it brittle. Reaction 1 below shows an example of such a polycondensation mechanism for a polymer containing comprises (3,3,3-trifluoropropyl)organosiloxane units.

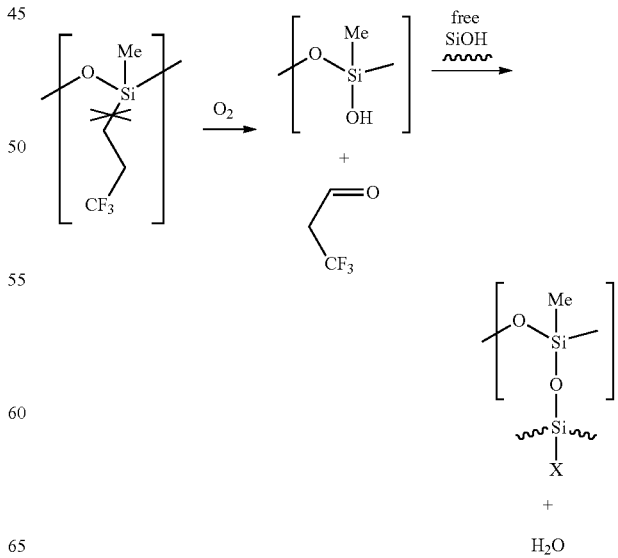

REACTION 1

The crosslinking of the fluorosilicone composition in Reaction 1 can be promoted by the presence of a filler comprising silanol (—Si—OH) groups, for example, silica.

Polymer digestion typically occurs at the end of the polymer chains resulting in the formation of cyclic compounds, which formation can be catalyzed by curing catalyst that is present in the fluorosilicone composition. Polymer digestion softens the fluorosilicone composition such that it loses its tensile strength. Reaction 2 below shows an example of polymer digestion.

REACTION 2

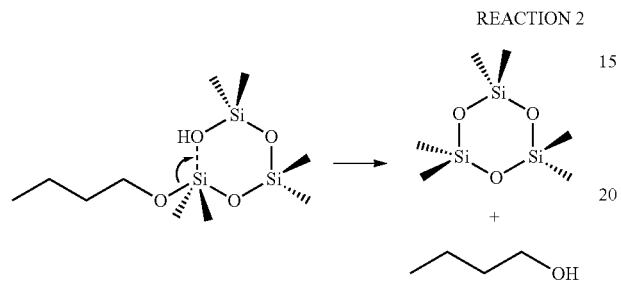

The polymer digestion mechanism can be slowed down by incorporating a non-reactive spacer filler, such as carbon black, in the fluorosilicone composition.

Thus, competing mechanisms occur during polymer degradation at elevated temperatures. The polycondensation hardens the fluorosilicone composition while polymer digestion softens the fluorosilicone composition. For a typical silica-filled fluorosilicone, embrittlement due to polycondendation is the dominant degradation mechanism during thermal degradation. The composition comprising fluorosilicone disclosed herein includes fillers that either promote or slow down crosslinking of the composition comprising fluorosilicone during the polycondensation mechanism or slow down the polymer digestion mechanism. As such, desired physical properties, such as suitable tensile strength and elongation, can be maintained in the composition comprising fluorosilicone even as it degrades in elevated temperatures.

The composition disclosed herein degrades at elevated temperatures in a suitable manner to retain suitable tensile strength and elongation. Disclosed is a composition comprising:
a) 100 parts by weight of a fluorosilicone;
b) from about 2 to about 20 parts by weight of a silicon-based crosslinker;
c) from about 0.1 to about 40 parts by weight of a first non-reactive spacer filler;
d) from about 0.1 to about 40 parts by weight of a second filler comprising one or more silanol groups; and
e) from about 0.01 to about 5 parts by weight of a curing catalyst.

Also disclosed is a composition comprising:
a) 100 parts by weight of a fluorosilicone;
b) from about 3 to about 10 parts by weight of a silicon-based crosslinker;
c) from about 2 to about 8 parts by weight of a first non-reactive spacer filler;
d) from about 8 to about 14 parts by weight of a second filler comprising one or more silanol groups; and
e) from about 0.03 to about 0.15 parts by weight of a curing catalyst.

Also disclosed is a composition comprising:
a) 100 parts by weight of a fluorosilicone;
b) from about 3 to about 10 parts by weight of a silicon-based crosslinker;
c) from about 2 to about 8 parts by weight of carbon black;
d) from about 8 to about 14 parts by weight of fumed silica; and
e) from about 0.03 to about 0.15 parts by weight of a curing catalyst.

Also disclosed is a composition comprising:
a) 100 parts by weight of a fluorosilicone;
b) from about 2 to about 20 parts by weight of a silicon-based crosslinker;
c) a first amount of a first non-reactive spacer filler;
d) a second amount of a second filler comprising one or more silanol groups; and
e) from about 0.01 to about 5 parts by weight of a curing catalyst,
   wherein the composition has a tensile strength of at least 200 psi after being exposed to 600° F. in air for 30 minutes.

Also disclosed is a composition comprising:
a) 100 parts by weight of a fluorosilicone;
b) from about 0.1 to about 40 parts by weight of a first non-reactive spacer filler;
c) from about 0.01 to about 5 parts by weight of a curing catalyst; and
d) from about 0.1 to about 20 parts by weight of a silanol resin and/or an untreated silica.

Also disclosed is a composition comprising:
a) 100 parts by weight of a fluorosilicone;
b) from about 0.1 to about 40 parts by weight of a first non-reactive spacer filler;
c) from about 0.03 to about 0.15 parts by weight of a curing catalyst;
d) from about 0.1 to about 20 parts by weight of a silanol resin and/or an untreated silica.
e) from about 3 to about 10 parts by weight of a silicon-based crosslinker; and
f) from about 8 to about 14 parts by weight of a second filler comprising one or more silanol groups.

Also disclosed is a composition comprising:
a) 100 parts by weight of a fluorosilicone;
b) from about 0.1 to about 40 parts by weight of carbon black or a pigment;
c) from about 0.03 to about 0.15 parts by weight of a curing catalyst;
d) from about 0.1 to about 20 parts by weight of a silanol resin and/or an untreated silica;
e) from about 3 to about 10 parts by weight of a silicon-based crosslinker; and
f) from about 8 to about 14 parts by weight of fumed silica.

Also disclosed is a composition comprising:
a) 100 parts by weight of a fluorosilicone;
b) a first amount of a first non-reactive spacer filler;
c) from about 0.01 to about 5 parts by weight of a curing catalyst;
d) a silanol resin and/or an untreated silica;
e) from about 2 to about 20 parts by weight of a silicon-based crosslinker; and
f) a second amount of a second filler comprising one or more silanol groups,
   wherein the composition has a tensile strength of at least 200 psi after being exposed to 600° F. in air for 60 minutes.

The first amount of the first non-reactive spacer filler and the second amount of a second filler comprising one or more silanol groups are balanced to achieve the tensile strength of at least 200 psi after being exposed to 600° F. in air for 30 minutes. As described herein, the fillers have to be balanced to achieve a suitable tensile strength.

In addition, the amount of a silanol resin and/or an untreated silica can be present and be adjusted to tune the degradation balance. Further, utilizing a silanol resin and/or an untreated silica in combination with two fillers (i.e., a first non-reactive spacer filler and a second filler comprising one or more silanol groups) can improve the desired tensile strength while simultaneously adjusting the degradation balance to the desired mechanism (i.e., softening, hardening). Thus, as described herein, a silanol resin and/or an untreated silica can be added to a fluorosilicone-based composition to achieve the preferred degradation mechanism. A silanol resin and/or an untreated silica can further be added to a fluorosilicone-based composition containing a balance between the amount of the first non-reactive spacer filler and the amount of the second filler comprising one or more silanol groups to achieve both the preferred degradation mechanism and a suitable tensile strength.

The composition disclosed herein is stable in the absence of moisture. That is, the fluorosilicone and the silicon-based crosslinker do not react to cure the composition without the presence of moisture. The composition cures upon exposure to moisture, such as the moisture present in ambient atmosphere, to give an elastomer. Thus, the composition can be kept in an essentially moisture free environment to prevent curing. For example, the composition can be kept in a container, such as a single use container, which prevents moisture, such as moisture in the atmosphere, from coming into contact with the composition to unintentionally cure the composition. The composition can be applied to a surface from the container, such as the single use container, and be cured over time when exposed to the moisture in the atmosphere. The cured composition is an elastomer. As such, the composition can be one-part fluorosilicone composition.

In one example, the tensile strength properties recited herein can be measured after 7 days after applying the composition and the composition being exposed to 25° C. at 50% humidity. In another example, tensile strength properties recited herein can be measured after exposing the composition to a temperature of 150° C. for 7 hours.

In one aspect, the composition can have a tensile strength of at least 200 psi after being exposed to 600° F. in air for 30 minutes. For example, the composition can have a tensile strength of at least 250 psi after being exposed to 600° F. in air for 30 minutes. In another example, the composition can have a tensile strength of at least 300 psi after being exposed to 600° F. in air for 30 minutes. In another example, the composition can have a tensile strength of at least 350 psi after being exposed to 600° F. in air for 30 minutes. In another example, the composition can have a tensile strength of at least 400 psi after being exposed to 600° F. in air for 30 minutes. In another example, the composition can have a tensile strength of at least 450 psi after being exposed to 600° F. in air for 30 minutes. In another example, the composition can have a tensile strength of at least 500 psi after being exposed to 600° F. in air for 30 minutes. In another example, the composition can have a tensile strength of at least 550 psi after being exposed to 600° F. in air for 30 minutes.

In one aspect, the composition can have a tensile strength of at least 200 psi after being exposed to 600° F. in air for 60 minutes. For example, the composition can have a tensile strength of at least 250 psi after being exposed to 600° F. in air for 60 minutes. In another example, the composition can have a tensile strength of at least 300 psi after being exposed to 600° F. in air for 60 minutes. In another example, the composition can have a tensile strength of at least 350 psi after being exposed to 600° F. in air for 60 minutes. In another example, the composition can have a tensile strength of at least 400 psi after being exposed to 600° F. in air for 60 minutes. In another example, the composition can have a tensile strength of at least 450 psi after being exposed to 600° F. in air for 60 minutes. In another example, the composition can have a tensile strength of at least 500 psi after being exposed to 600° F. in air for 60 minutes. In another example, the composition can have a tensile strength of at least 550 psi after being exposed to 600° F. in air for 60 minutes.

In one aspect, the composition can have an elongation of at least 300% after being exposed to 600° F. in air for 30 minutes. For example, the composition can have an elongation of at least 350% after being exposed to 600° F. in air for 30 minutes. In another example, the composition can have an elongation of at least 400% after being exposed to 600° F. in air for 30 minutes. In another example, the composition can have an elongation of at least 450% after being exposed to 600° F. in air for 30 minutes. In another example, the composition can have an elongation of at least 500% after being exposed to 600° F. in air for 30 minutes.

In one aspect, the composition can have an elongation of at least 300% after being exposed to 600° F. in air for 60 minutes. For example, the composition can have an elongation of at least 350% after being exposed to 600° F. in air for 60 minutes. In another example, the composition can have an elongation of at least 400% after being exposed to 600° F. in air for 60 minutes. In another example, the composition can have an elongation of at least 450% after being exposed to 600° F. in air for 60 minutes. In another example, the composition can have an elongation of at least 500% after being exposed to 600° F. in air for 60 minutes.

In one aspect, the composition can have a tensile strength of at least 200 psi and an elongation of at least 300% after being exposed to 600° F. in air for 30 minutes. For example, the composition can have a tensile strength of at least 250 psi and an elongation of at least 300% after being exposed to 600° F. in air for 30 minutes. In another example, the composition can have a tensile strength of at least 300 psi and an elongation of at least 300% after being exposed to 600° F. in air for 30 minutes. In another example, the composition can have a tensile strength of at least 350 psi and an elongation of at least 300% after being exposed to 600° F. in air for 30 minutes.

The tensile strength and elongation for the disclosed composition can be determined following the protocol in ASTM D 412.

1. Fluorosilicones

In one aspect, the fluorosilicone can be present in the composition from about 50 wt % to about 95 wt %. For example, the fluorosilicone can be present in the composition from about 60 wt % to about 90 wt %. In another example, the fluorosilicone can be present in the composition from about 70 wt % to about 90 wt %. In yet another example, the fluorosilicone can be present in the composition from about 80 wt % to about 90 wt %. In yet another example, the fluorosilicone can be present in the composition from about 50 wt % to about 90 wt %. In yet another example, the fluorosilicone can be present in the composition from about 50 wt % to about 80 wt %.

In one aspect, the fluorosilicone is a polymer capped at the molecular terminals with hydroxyl groups having a viscosity at 25° C. from 1,00 to 1,000,000 mPa*s represented by $OH(R^1R^2SiO)_nH$. $R^1$ is a monovalent hydrocarbon group having from 1 to 20 carbon atoms, from 50 to 100 mol % of R 2 are fluorine-substituted alkyl groups having from 1 to 12 carbon atoms, and "n" is a value such that the viscosity at 25° C. is from 1,000 to 1,000,000 mPa*s. For example, the fluorosilicone can have a viscosity at 25° C. is from 10,000 to 100,000 mPa*s, such as from 20,000 to 90,000 mPa*s, from 30,000 to 80,000 mPa*s, or from 40,000 to 60,000 mPa*s. Examples of the monovalent hydrocarbon group of $R^1$ and $R^2$ include methyl groups, hexyl groups, heptyl groups, and similar alkyl groups; vinyl groups, and similar alkenyl groups; phenyl groups, tolyl groups, xylyl groups, naphthyl groups, and similar aryl groups; benzyl groups, phenenthyl groups, and similar aralkyl groups; chloromethyl groups, 3-chloropropyl groups, 3,3,3-trifluoropropyl groups, nonafluorobutylethyl groups, and similar substituted alkyl groups. The fluorine-substituted alkyl group of R 2 represents an alkyl groups wherein one of more hydrogen is substituted by fluorine. Examples of the alkyl group include a methyl group, a thyl groups, a propyl groups, a butyl group, a pentyl group, a hexyl group, and a heptyl group. Examples of the fluorine-substituted alkyl group include a 3,3,3-trifluoropropyl group, a pentafluoroethyl group, a non-aluorobutylethyl group, and similar perfluoroalkyl groups.

In one aspect, the fluorosilicone can be a linear polymer. In another aspect, the fluorosilicone can be a branched polymer.

In one aspect, the fluorosilicone can be a homopolymer or copolymer or it may be a mixture of various homopolymers, copolymers or homopolymers and copolymers.

In one aspect, the fluorosilicone can a linear polysiloxane with at least 90% mol, at least 95% mol, at least 97% mol, at least 99% mol, or 100% mol of the back bone being trifluoropropylmethylsiloxy units. The fluorosilicone having a back bone comprising trifluoropropylmethylsiloxy units can be terminated with dimethylsilanol groups having a viscosity range of 40,000 to 60,000 mPa*s at 25° C.

2. Silicon-Based Crosslinkers

In one aspect, the silicon-based crosslinker can be present in the composition from about 2 to 20 parts by weight. For example, the silicon-based crosslinker can be present in the composition from about 2 to 15 parts by weight. In another example, the silicon-based crosslinker can be present in the composition from about 2 to 12 parts by weight. In another example, the silicon-based crosslinker can be present in the composition from about 2 to 10 parts by weight. In another example, the silicon-based crosslinker can be present in the composition from about 3 to 8 parts by weight. In another example, the silicon-based crosslinker can be present in the composition from 4 to 10 parts by weight. In another example, the silicon-based crosslinker can be present in the composition from 5 to 7 parts by weight.

In one aspect, the silicon-based crosslinker can be present in the composition in an amount of about 2 parts by weight. For example, the silicon-based crosslinker can be present in the composition in an amount of about 3 parts by weight. In another example, the silicon-based crosslinker can be present in the composition in an amount of about 4 parts by weight. In another example, the silicon-based crosslinker can be present in the composition in an amount of about 5 parts by weight. In another example, the silicon-based crosslinker can be present in the composition in an amount of about 6 parts by weight. In another example, the silicon-based crosslinker can be present in the composition in an amount of about 7 parts by weight. In another example, the silicon-based crosslinker can be present in the composition in an amount of about 8 parts by weight. In another example, the silicon-based crosslinker can be present in the composition in an amount of about 9 parts by weight. In another example, the silicon-based crosslinker can be present in the composition in an amount of about 10 parts by weight.

In one aspect, the silicon-based crosslinker can be a silane compound or a mixture of silane compounds. In another aspect, the silicon-based crosslinker can be one or more polysiloxanes. In one aspect, the silicon-based crosslinker being a polysiloxane can be a linear polysiloxane. In another example, the polysiloxane a branched polysiloxane. A linear or branched polysiloxane being a silicon-based crosslinker can comprise pendant and/or terminal functional groups. For example, the functional group can be a reactive group. Non-limiting examples of reactive groups include —OH, —COOH, —CHO, —NH$_2$, —CH=CH$_2$, —NCO, and —N$_3$.

In one aspect, the silicon-based crosslinker can be one or more acetoxysilicon compounds. Suitable non-limiting examples of acetoxysilicon compounds include organotriacetoxysilanes and organodiacetoxysilanes. Suitable non-limiting examples of organotriacetoxysilane compounds include vinyltriacetoxysilane, ethyltriacetoxysilane, methyltriacetoxysilane, phenyltriacetoxysilane, and 3-methacryloxypropyltriacetoxysilane, propyltriacetoxysilane; organo-diacetoxysilanes such as dimethyldiacetoxysilane, dibenzyloxydiacetoxysilane, di-t-butoxydiacetoxysilane, and vinylmethyldiacetoxysilane. In another example, the silicon-based crosslinker is ethyltriacetoxysilane. In another example, the silicon-based crosslinker is methyltriacetoxysilane. In another example, the silicon-based crosslinker is a combination of ethyltriacetoxysilane and methyltriacetoxysilane.

In one aspect, the silicon-based crosslinker can be one or more alkoxysilicon compounds. Suitable non-limiting examples of an alkoxysilicon compound include an orthosilicate, an alkylpolysilicate, a monoorganotrialkoxysilane, Si(OCH$_2$CH$_2$OCH$_3$)$_4$, Si(OCH$_2$CH$_2$OCH$_2$CH$_3$)$_4$, C$_6$H$_5$Si(OCH$_2$CH$_2$OCH$_3$)$_3$, and CF$_3$CH$_2$CH$_2$Si(OCH$_2$CH$_2$OCH$_3$)$_3$.

Suitable non-limiting examples of alkoxysilicon compounds include orthosilicates such as ethylorthosilicate, n-propylorthosilicate, amylorthosilicate, pentenylorthosilicate, diethyldipropylorthosilicate and hexylorthosilicate; alkylpolysilicates such as methylpolysilicate, ethylpolysilicate, isopropylpolysilicate, n-propylpolysilicate, secondary amylpolysilicate and n-butylpolysilicate; monoorganotrialkoxysilanes such as methyltrimethoxysilane, ethyltriethoxysilane, propyltrimethoxysilane, methyltriisopropoxysilane, phenyltrimethoxysilane, vinyltrimethoxysilane; and other alkoxysilicon compounds such as Si(OCH$_2$CH$_2$OCH$_3$)$_4$, Si(OCH$_2$CH$_2$OCH$_2$CH$_3$)$_4$, C$_6$H$_5$Si(OCH$_2$CH$_2$OCH$_3$)$_3$, and CF$_3$CH$_2$CH$_2$Si(OCH$_2$CH$_2$OCH$_3$)$_3$.

In one aspect, the silicon-based crosslinker can be one or more organosilanes with the formula $R^3{}_a SiX_{4-a}$, wherein $R^3$ is a monovalent hydrocarbon group having from 1 to 10 carbon atoms, X is a hydrolysable group, and "a" is 0 or, and an organosiloxane oligomer, which is a partially hydrolyzed condensate of said organosilane. Examples of the monovalent hydrocarbon group of R 3 include methyl groups, ethyl groups, propyl groups, butyl groups, pentyl groups, hexyl groups, heptyl groups, and similar alkyl groups; vinyl groups, allyl groups, butenyl groups, pentenyl groups, hexenyl groups, and similar alkenyl groups; phenyl groups, tolyl groups, xylyl groups, naphthyl groups, and similar aryl groups; benzyl groups, phenethyl groups, and similar aralkyl groups; chloromethyl groups, 3-chloropropyl groups, 3,3,3-trifluoropropyl groups, nonafluorobutylethyl groups, and similar substituted alkyl groups. Examples of X include dimethylketoximo groups, methylethyl ketoximo groups, and similar ketoximo groups (also called "ketoximino groups", i.e. groups represented by the general formula: –O—N=CR$^4$R$^5$ (wherein Rand Rare identical or different alkyl groups, preferably alkyl groups having from 1 to 6 carbon atoms)); methoxy groups, ethoxy groups, and similar alkoxy groups; acetoxy groups and similar acyloxy groups; N-butylamino groups, N, N-diethylamino groups, and similar alkylamino groups; N-methylacetamide groups and similar acylamide groups; N,N-diethylaminoxy groups and similar N,N-dialkylaminoxy groups; and propenoxy groups and similar alkenyloxy groups.

In one aspect, the formula $R^3_aSiX_{4-a}$ can be a tetraketoximosilane, a triketoximosilane, a triacetoxysilane, or a mixture thereof. Examples of the triketoximosilane include, but are not limited to, methyl triketoximosilane and vinyl triketoximosilane. Examples of the triacetoxysilane include, but are not limited to, methyl triacetoxysilane and ethyl triacetoxysilane.

In one aspect, the composition does not comprise a silicon-based crosslinker such as, for example, when the composition comprises a silanol resin and/or untreated silica as described herein. Thus, in various aspects, the composition comprises a silanol resin and/or untreated silica in lieu of a silicon-based crosslinker. Alternatively, in various other aspects, the composition comprises a silanol resin and/or untreated silica in addition to a silicon-based crosslinker. In another aspect, the silicon-based crosslinker is not a silanol resin. In another aspect, the silicon-based crosslinker is not untreated silica.

3. Curing Catalysts

It is understood that the fluorosilicone and the silicon-based crosslinker contain moieties that are compatible to crosslink (cure) in the presence of the curing catalyst.

In one aspect, the composition cures through the condensation of acetoxys, alkoxys, or oximes bonded to silicon and hydroxyls bonded to silicon in the presence of a curing catalyst. The condensation reaction can occur at room temperature.

In one aspect, the curing catalyst can one or more metal salts of carboxylic acids. In one aspect, the curing catalyst can a tin-based catalyst. Suitable non-limiting curing catalysts include lead naphthenate, cobalt naphthenate, zinc naphthenate, sodium naphthenate, iron-2-ethylhexoate, lead 2-ethylhexoate, chromium octoate, dibutyltin dibenzoate, dibutyltin adipate, lead sebacate, dibutyltin dilactate, dibutyltin diacetate, dibutyltindilaurate, lead octoate, tin ricinoleate, cobalt hexoate, aluminum acetyl-acetonate, zirconium acetoacetate, dioctyltindimaleinate, and stannous octoate. In another example, the curing catalyst is dibutyltin diacetate.

In one aspect, the curing catalyst can be present in the composition from 0.01 to 5 parts by weight. For example, the curing catalyst can be present in the composition from 0.03 to 5 parts by weight. In another example, the curing catalyst can be present in the composition from 0.01 to 2 parts by weight. In yet another example, the curing catalyst can be present in the composition from 0.01 to 0.5 parts by weight. In yet another example, the curing catalyst can be present in the composition from 0.01 to 0.3 parts by weight. In yet another example, the curing catalyst can be present in the composition from 0.03 to 0.15 parts by weight.

In one aspect, the curing catalyst can be present in the composition in about 0.03 parts by weight. For example, the curing catalyst can be present in the composition in about 0.04 parts by weight. In another example, the curing catalyst can be present in the composition in about 0.05 parts by weight. In yet another example, the curing catalyst can be present in the composition in about 0.06 parts by weight. In yet another example, the curing catalyst can be present in the composition in about 0.07 parts by weight. In yet another example, the curing catalyst can be present in the composition in about 0.08 parts by weight. In yet another example, the curing catalyst can be present in the composition in about 0.09 parts by weight. In yet another example, the curing catalyst can be present in the composition in about 0.1 parts by weight.

4. Non-Reactive Spacer Fillers and Second Fillers

The disclosed composition comprises a first non-reactive spacer filler. The first non-reactive spacer filler does not react with the fluorosilicone, or the silicon-based crosslinker, or the polymer formed by the curing by the fluorosilicone and the silicon-based crosslinker. In addition, the first non-reactive spacer filler creates space between polymer strands in the cured fluorosilicone composition. The first non-reactive spacer filler functions to slow down the polymer digestion and polycondensation mechanisms, which degrades and softens the cured fluorosilicone composition.

In various aspects, the disclosed composition also comprises a second filler comprising one or more silanol groups. The second filler can comprise two or more silanol groups. The second filler can comprise one or more silanol groups at a density that of commercially available silica. The second filler comprising one or more silanol groups promotes crosslinking of polymer strands that undergo polycondensation during thermal degradation. This crosslinking hardens the compositions.

Thus, in various aspects, the composition disclosed herein includes a second filler comprising one or more silanol groups that promotes crosslinking of the composition comprising fluorosilicone during the polycondensation degradation, and a first non-reactive spacer filler that slow down the polymer digestion mechanism. As such, the first non-reactive spacer filler and the second filler comprising one or more silanol groups work together to control the thermal degradation of the composition such that desired physical properties, such as suitable tensile strength and elongation, can be maintained at suitable levels in the composition even as it degrades in elevated temperatures.

Without wishing to be bound by theory, the combination of a first non-reactive spacer filler and a second filler beneficially protects against multiple types of known degradation processes. By balancing the proportions of these two components, the hardening and softening of the resultant material can be balanced out, thereby stably maintaining the crosslink density as the material degrades. For example, for an alternative fluorosilicone composition that does not include the first non-reactive spacer filler and the second filler in the proportions disclosed herein, the species associated with the hardening mechanism begins to appear around 250° C. and the species associated with softening mechanism begins to appear around 325-350° C. In contrast, the species associated with the hardening mechanism does not occur until much higher temperatures, e.g., 325° C., for the instantly claimed compositions. In this way, the hardening and softening mechanism are said to be approximately balanced. The resultant material thus remains stable at higher temperatures for a longer period of time compared to alternative fluorosilicone compositions.

The weight ratio between the first non-reactive spacer filler and the second filler comprising one or more silanol groups can determine how the cured composition disclosed herein degrades when exposed to elevated temperatures. The weight ratio between the first non-reactive spacer filler and the second filler comprising one or more silanol groups can be tailored to achieve a desired balanced degradation of the cured composition such that it maintains acceptable levels of physical properties, such as tensile strength and elongation. The weight ratio between the first non-reactive spacer filler and the second filler comprising one or more silanol groups can be tailored to achieve a preferred degradation at various temperatures. For example, if a composition is to be exposed to 200° C. during use, it can have a weight ratio between the first non-reactive spacer filler and the second filler comprising one or more silanol groups specific to that temperature, while a composition is to be exposed to 300° C. during use can have a different weight ratio between the first non-reactive spacer filler and the second filler comprising one or more silanol groups specific to that temperature.

In one aspect, the composition can comprise a higher weight % of the first non-reactive spacer filler than the second filler comprising one or more silanol groups. For example, the composition can comprise a higher parts by weight of the first non-reactive spacer filler than the second filler comprising one or more silanol groups.

In one aspect, the composition can comprise a higher weight % of the second filler comprising one or more silanol groups than the first non-reactive spacer filler. For example, the composition can comprise a higher parts by weight of the second filler comprising one or more silanol groups than the first non-reactive spacer filler.

In one aspect, the weight ratio of the first non-reactive spacer filler to the second filler comprising one or more silanol groups is from about 1:0.05 to about 1:20. For example, the weight ratio of the first non-reactive spacer filler to the second filler comprising one or more silanol groups is from about 1:0.3 to about 1:20. In another example, the weight ratio of the first non-reactive spacer filler to the second filler comprising one or more silanol groups is from about 1:0.5 to about 1:20. In another example, the weight ratio of the first non-reactive spacer filler to the second filler comprising one or more silanol groups is from about 1:0.5 to about 1:10. In another example, the weight ratio of the first non-reactive spacer filler to the second filler comprising one or more silanol groups is from about 1:0.5 to about 1:7. In another example, the weight ratio of the first non-reactive spacer filler to the second filler comprising one or more silanol groups is from about 1:1 to about 1:20. In another example, the weight ratio of the first non-reactive spacer filler to the second filler comprising one or more silanol groups is from about 1:1 to about 1:15. In another example, the weight ratio of the first non-reactive spacer filler to the second filler comprising one or more silanol groups is from about 1:1 to about 1:10. In another example, the weight ratio of the first non-reactive spacer filler to the second filler comprising one or more silanol groups is from about 1:1 to about 1:7. In another example, the weight ratio of the first non-reactive spacer filler to the second filler comprising one or more silanol groups is from about 1:1 to about 1:5. In another example, the weight ratio of the first non-reactive spacer filler to the second filler comprising one or more silanol groups is from about 1:1.5 to about 1:20. In another example, the weight ratio of the first non-reactive spacer filler to the second filler comprising one or more silanol groups is from about 1:1.5 to about 1:10. In another example, the weight ratio of the first non-reactive spacer filler to the second filler comprising one or more silanol groups is from about 1:1.5 to about 1:7. In another example, the weight ratio of the first non-reactive spacer filler to the second filler comprising one or more silanol groups is from about 1:2 to about 1:10. In another example, the weight ratio of the first non-reactive spacer filler to the second filler comprising one or more silanol groups is from about 1:2 to about 1:7. In another example, the weight ratio of the first non-reactive spacer filler to the second filler comprising one or more silanol groups is from about 1:2 to about 1:5. In another example, the weight ratio of the first non-reactive spacer filler to the second filler comprising one or more silanol groups is from about 1:0.1 to about 1:3. In another example, the weight ratio of the first non-reactive spacer filler to the second filler comprising one or more silanol groups is from about 1:0.3 to about 1:2. In another example, the weight ratio of the first non-reactive spacer filler to the second filler comprising one or more silanol groups is from about 1:0.3 to about 1:1.5. In another example, the weight ratio of the first non-reactive spacer filler to the second filler comprising one or more silanol groups is from about 1:0.3 to about 1:1. In another example, the weight ratio of the first non-reactive spacer filler to the second filler comprising one or more silanol groups is from about 1:0.5 to about 1:1. In another example, the weight ratio of the first non-reactive spacer filler to the second filler comprising one or more silanol groups is from about 1:0.3 to about 1:0.9. In another example, the weight ratio of the first non-reactive spacer filler to the second filler comprising one or more silanol groups is from about 1:0.3 to about 1:0.8. In another example, the weight ratio of the first non-reactive spacer filler to the second filler comprising one or more silanol groups is from about 1:0.4 to about 1:0.8. In another example, the weight ratio of the first non-reactive spacer filler to the second filler comprising one or more silanol groups is from about 1:0.5 to about 1:0.8. In another example, the weight ratio of the first non-reactive spacer filler to the second filler comprising one or more silanol groups is from about 1:0.6 to about 1:0.8. In another example, the weight ratio of the first non-reactive spacer filler to the second filler comprising one or more silanol groups is from about 1:0.6 to about 1:0.7. In another example, the weight ratio of the first non-reactive spacer filler to the second filler comprising one or more silanol groups is about 1:0.67. In another example, the weight ratio of the first non-reactive spacer filler to the second filler comprising one or more silanol groups is from about 1:1 to about 1:5. In another example, the weight ratio of the first non-reactive spacer filler to the second filler comprising one or more silanol groups is from about 1:3 to about 1:5.

In one aspect, the weight ratio of the first non-reactive spacer filler to the second filler comprising one or more silanol groups is from about 3:23 to about 2:7. For example, the weight ratio of the first non-reactive spacer filler to the second filler comprising one or more silanol groups is from about 3:23 to about 2:5. In another example, the weight ratio of the first non-reactive spacer filler to the second filler comprising one or more silanol groups is from about 3:23 to about 2:3. In another example, the weight ratio of the first non-reactive spacer filler to the second filler comprising one or more silanol groups is from about 3:20 to about 2:7. In another example, the weight ratio of the first non-reactive spacer filler to the second filler comprising one or more silanol groups is from about 3:17 to about 2:7. In another example, the weight ratio of the first non-reactive spacer filler to the second filler comprising one or more silanol groups is from about 3:20 to about 2:5. In another example, the weight ratio of the first non-reactive spacer filler to the second filler comprising one or more silanol groups is from about 3:17 to about 2:3.

In one aspect, the composition can comprise from about 0.1 to about 40 parts by weight of the first non-reactive spacer filler. For example, the composition can comprise from about 0.5 to about 40 parts by weight of the first non-reactive spacer filler. In another example, the composition can comprise from about 1 to about 40 parts by weight of the first non-reactive spacer filler. In another example, the composition can comprise from about 1 to about 30 parts by weight of the first non-reactive spacer filler. In another example, the composition can comprise from about 1 to about 25 parts by weight of the first non-reactive spacer filler. In another example, the composition can comprise from about 1 to about 20 parts by weight of the first non-reactive spacer filler. In another example, the composition can comprise from about 1 to about 15 parts by weight of the first non-reactive spacer filler. In another example, the composition can comprise from about 1 to about 10 parts by weight of the first non-reactive spacer filler. In another example, the composition can comprise from about 3 to about 30 parts by weight of the first non-reactive spacer filler. In another example, the composition can comprise from about 3 to about 20 parts by weight of the first non-reactive spacer filler. In another example, the composition can comprise from about 3 to about 10 parts by weight of the first non-reactive spacer filler. In another example, the composition can comprise from about 3 to about 15 parts by weight of the first non-reactive spacer filler. In yet another example the composition can comprise from about 3 to about 12 parts by weight of the first non-reactive spacer filler. In yet another example, the composition can comprise from about 5 to about 20 parts by weight of the first non-reactive spacer filler. In yet another example, the composition can comprise from about 10 to about 20 parts by weight of the first non-reactive spacer filler. In yet another example, the composition can comprise from about 12 to about 20 parts by weight of the first non-reactive spacer filler. In yet another example, the composition can comprise from about 5 to about 15 parts by weight of the first non-reactive spacer filler. In yet another example, the composition can comprise from about 7 to about 13 parts by weight of the first non-reactive spacer filler. In yet another example, the composition can comprise from about 8 to about 12 parts by weight of the first non-reactive spacer filler. In yet another example, the composition can comprise from about 15 to about 20 parts by weight of the first non-reactive spacer filler. In one aspect, the first amount of the first non-reactive spacer filler can be any amount of the first non-reactive spacer filler disclosed herein.

In one aspect, the first non-reactive spacer filler are particles having an average particle size from about 5 nm to 1 μm. For example, the first non-reactive spacer filler is a particle that can have an average particle size from about 5 nm to 500 nm. In another example, the first non-reactive spacer filler are particles that can have an average particle size from about 5 nm to 250 nm. In yet another example, the first non-reactive spacer filler are particles that can have an average particle size from about 5 nm to 100 nm. In yet another example, the first non-reactive spacer filler are particles that can have an average particle size from about 5 nm to 75 nm. In yet another example, the first non-reactive spacer filler are particles that can have an average particle size from about 5 nm to 50 nm. In yet another example, the first non-reactive spacer filler are particles that can have an average particle size from about 10 nm to 40 nm. In yet another example, the first non-reactive spacer filler are particles that can have an average particle size from about 20 nm to 50 nm. In yet another example, the first non-reactive spacer filler are particles that can have an average particle size from about 20 nm to 100 nm.

In one aspect, the first non-reactive spacer filler can be transparent or translucent. For example, the first non-reactive spacer filler can be transparent. In another example, the first non-reactive spacer filler can be translucent.

In one aspect, the first non-reactive spacer filler can be carbon black, graphite, graphene, a carbon nanotube, a pigment, quartz, or combination thereof. For example, the first non-reactive spacer filler can be carbon black. The carbon black can be acetylene black, channel black, furnace black, lamp black or thermal black, or a combination thereof. Carbon black is available through commercial sources. In another example, the first non-reactive spacer filler can be graphite, such as expandable graphite. In another example, the first non-reactive spacer filler can be a pigment. Suitable pigments include, but are not limited to, azo pigments (e.g., cinilex red), phthalocyanine pigments (e.g., ferro blue), quinacridone pigments, and inorganic pigments (e.g., titanium dioxide). In another example, the first non-reactive spacer filler can be quartz. In another example, the first non-reactive spacer filler can be a carbon nanotube. In another example, the first non-reactive spacer filler can be graphene.

In one aspect, the composition can comprise from about 0.1 to about 40 parts by weight of the second filler comprising one or more silanol groups. For example, the composition can comprise from about 0.5 to about 40 parts by weight of the second filler comprising one or more silanol groups. In another example, the composition can comprise from about 1 to about 40 parts by weight of the second filler comprising one or more silanol groups. In another example, the composition can comprise from about 1 to about 30 parts by weight of the second filler comprising one or more silanol groups. In another example, the composition can comprise from about 1 to about 25 parts by weight of the second filler comprising one or more silanol groups. In another example, the composition can comprise from about 1 to about 20 parts by weight of the second filler comprising one or more silanol groups. In another example, the composition can comprise from about 1 to about 15 parts by weight of the second filler comprising one or more silanol groups. In another example, the composition can comprise from about 1 to about 10 parts by weight of the second filler comprising one or more silanol groups. In another example, the composition can comprise from about 3 to about 30 parts by weight of the second filler comprising one or more silanol groups. In another example, the composition can comprise from about 3 to about 20 parts by weight of the second filler comprising one or more silanol groups. In another example, the composition can comprise from about 3 to about 10 parts by weight of the second filler comprising one or more silanol groups. In another example, the composition can comprise from about 3 to about 15 parts by weight of the second filler comprising one or more silanol groups. In yet another example the composition can comprise from about 3 to about 12 parts by weight of the second filler comprising one or more silanol groups. In yet another example, the composition can comprise from about 5 to about 20 parts by weight of the second filler comprising one or more silanol groups. In yet another example, the composition can comprise from about 10 to about 20 parts by weight of the second filler comprising one or more silanol groups. In yet another example, the composition can comprise from about 12 to about 20 parts by weight of the second filler comprising one or more silanol groups. In yet another example, the composition can comprise from about 5 to about 15 parts by weight of the second filler comprising one or more silanol groups. In yet another example, the composition can comprise from about 7 to about 13 parts by weight of the second filler comprising one or more silanol groups. In yet another example, the composition can comprise from about 8 to about 12 parts by weight of the second filler comprising one or more silanol groups. In one aspect, the second amount of the second filler comprising one or more silanol groups can any amount of the second filler comprising one or more silanol groups disclosed herein.

In one aspect, the second filler comprising one or more silanol groups is a particle having an average particle size from about 2 nm to 1 µm. For example, the second filler comprising one or more silanol groups is a particle that can have an average particle size from about 5 nm to 500 nm. In another example, the second filler comprising one or more silanol groups are particles that can have an average particle size from about 5 nm to 250 nm. In yet another example, the second filler comprising one or more silanol groups are particles that can have an average particle size from about 5 nm to 100 nm. In yet another example, the second filler comprising one or more silanol groups are particles that can have an average particle size from about 5 nm to 75 nm. In yet another example, the second filler comprising one or more silanol groups are particles that can have an average particle size from about 5 nm to 50 nm. In yet another example, the second filler comprising one or more silanol groups are particles that can have an average particle size from about 5 nm to 40 nm. In yet another example, the second filler comprising one or more silanol groups are particles that can have an average particle size from about 5 nm to 30 nm. In yet another example, the second filler comprising one or more silanol groups are particles that can have an average particle size from about 20 nm to 40 nm. In yet another example, the second filler comprising one or more silanol groups are particles that can have an average particle size from about 20 nm to 100 nm.

In one aspect, the second filler comprising one or more silanol groups can be transparent or translucent. For example, the second filler comprising one or more silanol groups can be transparent. In another example, the second filler comprising one or more silanol groups can be translucent.

In one aspect, second filler comprising one or more silanol groups is silica. In another aspect, the silica can be hydrophilic silica. In another aspect, the silica can be fumed silica. In another aspect, the silica can be wet silica. In another aspect, the silica can be surface treated such as, for example, highly surface treated. In one aspect, the silica can have a BET surface area from about 50 $m^2/g$ to about 1,000 $m^2/g$, for example, from about 50 $m^2/g$ to about 500 $m^2/g$, from about 50 $m^2/g$ to about 300 $m^2/g$, from about 50 $m^2/g$ to about 200 $m^2/g$, from about 80 $m^2/g$ to about 120 $m^2/g$.

In one aspect, the first non-reactive spacer filler and the second filler comprising one or more silanol groups are homogenously dispersed in the composition.

In one aspect, the composition does not comprise a metal oxide filler, such as calcium carbonate. In another aspect, the composition does not comprise an activate carbon filler. In another aspect, the composition does not comprise a filler except the first non-reactive spacer filler and the second filler comprising one or more silanol groups. For example, the composition does not comprise a filler except carbon black and silica.

In one aspect, the composition does not comprise a second filler such as, for example, when the composition comprises a silanol resin and/or untreated silica as described herein. Thus, in various aspects, the composition comprises a silanol resin and/or untreated silica in lieu of a second filler. Alternatively, in various other aspects, the composition comprises a silanol resin and/or untreated silica in addition to a second filler. In another aspect, the second filler is not a silanol resin. In another aspect, the second filler is not untreated silica.

5. Silanol Resins and Untreated Silica

In one aspect, the disclosed composition comprises a silanol resin and/or an untreated silica. For example, the composition can comprise a silanol resin. In another example, the composition can comprise untreated silica. In yet another example, the composition can comprise a silanol resin and an untreated silica As described herein, a silanol resin and/or an untreated silica can be used to selectively tune the degradation balance. For example, by adjusting (e.g., increasing) the amount of silanol resin and/or untreated silica, the final failure mode of the composition can be tuned towards the hardening mechanism (i.e., embrittlement). Alternatively, the amount of silanol resin and/or untreated silica can be adjusted (e.g., decreased) to tune the final failure mode towards the softening mechanism. In this way, the degradation balance can be fine-tuned to achieve the desired result. Moreover, this fine-tuning can beneficially be accomplished via the mere adjustment of the identity and amount of silanol resin and/or untreated silica, rather than by necessitating that multiple bases be prepared and separately mixed.

The disclosed composition can comprise either a silanol resin and/or untreated silica alone, or in combination with one or more of a silicon-based crosslinker and a second filler as described herein to uniquely balance the degradation mechanism and resulting performance (e.g., tensile strength, elongation) based on the desired end use. Thus, the relative proportions of the non-reactive spacer filler to the second filler serve to improve the crosslink density, and, thus, the thermal stability, while the amount of silanol resin and/or untreated silica present serve to tune the degradation balance. Without wishing to be bound by theory, the interplay between these components allows for a significant amount of control over the properties of the final composition.

In one aspect, the disclosed composition comprises a silanol resin (i.e., a resin coated with silanol groups). In one aspect, the silanol resin can be a linear silanol resin. In another example, the silanol resin can be a branched silanol resin. A linear or branched silanol resin can comprise pendant and/or terminal —OH functional groups. Non-limiting examples of suitable silanol resins may include MQ resins, DT resins, MDQ resins, MTQ resins, M resins, Q resins, VMQ resins, and PVMQ resins. In another example, the silanol resin is a MQ resin.

In one aspect, the disclosed composition comprises untreated (hydrophilic) silica. In another aspect, the disclosed composition comprises untreated fumed silica.

In one aspect, the silanol resin and/or untreated silica can be present in the composition from about 0.1 to 20 parts by weight. For example, the resin can be present in the composition from 0.1 to 15 parts by weight. For example, the resin can be present in the composition from 0.1 to 10 parts by weight. For example, the resin can be present in the composition from 0.1 to 5 parts by weight. For example, the resin can be present in the composition from 1 to 20 parts by weight. For example, the resin can be present in the composition from 2 to 20 parts by weight. For example, the resin can be present in the composition from 5 to 20 parts by weight. For example, the resin can be present in the composition from 10 to 20 parts by weight. For example, the resin can be present in the composition from 15 to 20 parts by weight. For example, the resin can be present in the composition from 1 to 15 parts by weight. For example, the resin can be present in the composition from 2 to 10 parts by weight.

6. Optional Additives

In one aspect, other components can be present as additives to further enhance the performance of the composition. When the composition comprises one or more additives, the one or more additives can be selected from the group consisting of an electrically conductive material, a thermally conductive material, an UV absorber, an adhesion promoter, matting agents, or a combination thereof. Examples of suitable additive materials include but are not limited to: particulate forms of oxides of titanium, cerium, aluminum, zirconium and other metals and metalloids present with or without surface modification, inorganic fillers such as talc, carborundum, mica, boron nitride, inorganic fillers such as clay, kaolin, fillers of biological origin such as polysaccharides, and suitable combinations thereof. The functional additives may be dissolved or dispersed in the final composition.

Non-limiting examples of suitable inorganic compounds may include carbon blacks, oxides or sulfides of metals such as titanium dioxide, iron oxide, cadmium sulfide, or chromia.

In one aspect, when the additive comprises an electrically conductive material, the additive may consist of one or more electrically conductive materials. Non-limiting examples of electrically conductive fillers may include powders of metals such as silver or gold, metal shavings, and metal coated particles.

In one aspect, when the additive comprises a thermally conductive material, the additive may consist of one or more thermally conductive materials. Non-limiting examples of thermally conductive materials may include carbides, nitrides, and oxides of metals like boron nitride, silicon carbide, or aluminum oxide.

In one aspect, when the additive comprises a UV absorber, the UV absorber can be one or more compounds that absorb harmful ultraviolet radiation and dissipate it as heat. Non-limiting examples of suitable UV absorbers may include a benzo compound, an aryl ester, an oxanilide, an acrylic ester, and formamidine.

In one aspect, the composition can further comprise a solvent, which is used to reduce viscosity and improve ease of application of the composition. The amount of solvent necessary to reduce viscosity is dependent on solvent type and user application. One skilled in the art will choose the appropriate solvent and amount necessary for their application. For example, the composition with a solvent can be applied via a variety of techniques, such as, for example, via spray deposition, painting, and roll deposition.

In one aspect, when the composition further comprises a solvent, the solvent can be a volatile organic solvent. The solvent must be non-reactive with the polysiloxane and the silicone based crosslinker and other active ingredients in the composition. The purpose of this solvent is to dilute the composition by dissolving or suspending it to create an easily spreadable composition having a viscosity suitable for application to the substrate. Non-limiting examples of suitable solvents include petroleum fractions such as standard solvent and naphtha; alcohols, particularly C-C4 alcohols, such as methyl, ethyl, propyl, isopropyl, butyl, isobutyl and tert-butyl alcohols; esters including C-C4 esters, such as ethyl acetate, methyl acetate, tert-butyl acetate, and propyl acetate; chlorinated hydrocarbons such as 1,1,1-trichloroethane, perchloroethylene triohloromethane, methylene dichloride and other halogenated hydrocarbons such as freons; aromatic hydrocarbons such as toluene, xylene and ethyl benzene; aliphatic hydrocarbons such as hexane, heptane and cyclohexane; glycol ethers such as the ethylene glycolmethyl ether, ethylene glycol butyl ether; proprietary solvents such as Cellosolve, a product of Union Carbide, or Dowanol, a product of Dow Chemical Company; and ketones such as dimethyl ketone and methyl ethyl ketone. Mixtures of the foregoing solvents may also be used.

In one aspect, when the composition further comprises a solvent, the solvent can be present in the composition from about 1 to 500 parts by weight of fluorosilicone. For example, when the composition further comprises a solvent, the solvent can be present in the composition from 100 to 450 parts by weight of fluorosilicone. For example, when the composition further comprises a solvent, the solvent can be present in the composition from 200 to 400 parts by weight of fluorosilicone. In a preferred example, when the composition further comprises a solvent, the solvent can be present in the composition from 300 400 parts by weight of fluorosilicone.

In one aspect, the composition disclosed herein can be used in a one-component configuration. That is, all components of the composition are together in a single container, such as a single barrel applicator, prior to use and curing. The composition disclosed herein can alternatively be used in a two-component configuration. That is, one or more of the components are separated from the other components in the composition until they are all mixed together just prior to application. For example, the silicon-based crosslinker and/or curing catalyst can be separated from the other components prior to mixing and application. A two-component configuration can be present in a two-chamber type applicator, such as a double barrel applicator.

7. Cured Compositions

In one aspect, the composition is cured. A cured composition means that the fluorosilicone and the silicon-based crosslinker has crosslink in the presence of the curing catalyst. The cured composition can be a coating in solid form having a uniform thickness.

In one aspect, the composition is a coating having a thickness from about 5 µm to about 1000 µm. For example, the composition can be a coating having a thickness from about 5 µm to about 300 µm. In another example, the composition can be a coating having a thickness from about 5 µm to about 100 µm. In yet another example, the composition can be a coating having a thickness from about 5 µm to about 50 µm. In yet another example, the composition can be a coating having a thickness from about 20 µm to about 100 µm. In yet another example, the composition can be a coating having a thickness from about 20 µm to about 500 µm. In yet another example, the composition can be a coating having a thickness from about 50 µm to about 500 µm. In yet another example, the composition can be a coating having a thickness from about 100 µm to about 1000 µm.

In one aspect, the cured composition can be an article, such as an O-ring.

Also disclosed herein is a kit comprising:
a) 100 parts by weight of a fluorosilicone;
b) from about 2 to about 20 parts by weight of a silicon-based crosslinker;
c) from about 0.1 to about 40 parts by weight of a first non-reactive spacer filler;
d) from about 0.1 to about 40 parts by weight of a second filler comprising one or more silanol groups; and
e) from about 0.01 to about 5 parts by weight of a curing catalyst; and
a container containing parts a)-e).

Also disclosed herein is a kit comprising:
a) 100 parts by weight of a fluorosilicone;
b) from about 0.1 to about 40 parts by weight of a first non-reactive spacer filler;
c) from about 0.01 to about 5 parts by weight of a curing catalyst;
d) from about 0.1 to about 20 parts by weight of a silanol resin and/or an untreated silica; and
e) a container containing parts a)-e).

In one aspect, the kit further comprises:
a) from about 3 to about 10 parts by weight of a silicon-based crosslinker; and
b) from about 8 to about 14 parts by weight of a second filler comprising one or more silanol groups.

The kit can comprise all compositions disclosed herein.

In one aspect, the container is a single chamber container, wherein parts a)-e) are all present in the single chamber. In another aspect, the container is a double chamber container, wherein some of parts a)-e) are present in one chamber and the remaining parts of parts a)-e) are present in the other chamber. In one aspect, the container can be sealed.

In one aspect, the kit further comprises instructions for use.

C. Methods

Also disclosed herein, is a method of using the composition disclosed herein. The composition disclosed herein can be used as an original coating on a surface. The surface can be close to an engine or other source of heat.

In one aspect, the surface can be a metal. Suitable non-limiting examples of metal substrates include iron, steel, stainless steel, aluminum, titanium, copper, tin, nickel, cobalt, and alloys thereof.

In another aspect, the surface can be a carbon fiber. In yet another aspect, the substrate can be a composite material. In yet another aspect, the substrate can be paint, for example paint on aircrafts or vehicles.

In another aspect, the surface can be plastics. Suitable non-limiting examples of plastic surfaces include polycarbonate, polysulfone, polyacrylate, polyurethane, and polyethylenes. In yet another aspect, the surface can be a silicone substrate.

In one aspect, the surface can be a surface on an aircraft. In another aspect, the substrate can be a substrate on a vehicle, such as a marine, terrestrial, or extra-terrestrial vehicle.

Disclosed herein is a method comprising the steps of:
a) applying the composition disclosed herein to a surface; and
b) curing the applied composition.

D. Aspects

In view of the disclosure herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A composition comprising:
a) 100 parts by weight of a fluorosilicone;
b) from about 2 to about 20 parts by weight of a silicon-based crosslinker;
c) from about 0.1 to about 40 parts by weight of a first non-reactive spacer filler;
d) from about 0.1 to about 40 parts by weight of a second filler comprising one or more silanol groups; and
e) from about 0.01 to about 5 parts by weight of a curing catalyst.

Aspect 2: The composition of aspect 1, wherein the composition has a tensile strength of at least 200 psi after being exposed to 600° F. in air for 60 minutes.

Aspect 3: The composition of aspects 1 or 2, wherein the composition has a tensile strength of at least 350 psi after being exposed to 600° F. in air for 30 minutes.

Aspect 4: The composition of any one of aspects 1-3, wherein the composition has an elongation of at least 300% after being exposed to 600° F. in air for 30 minutes.

Aspect 5: The composition of any one of aspects 1-4, wherein the fluorosilicone comprises a perfluoroalkyl polydiorganopolysiloxane.

Aspect 6: The composition of any one of aspects 1-5, wherein the fluorosilicone comprises (3,3,3-trifluoropropyl) organosiloxane units.

Aspect 7: The composition of any one of aspects 1-6, wherein the silicon-based crosslinker comprises an alkoxy-silicon compound, an acetoxysilicon compound, a ketoximosilicon compound, or a combination thereof.

Aspect 8: The composition of any one of aspects 1-7, wherein the composition comprises from about 3 to about 8 parts by weight of the silicon-based crosslinker.

Aspect 9: The composition of any one of aspects 1-8, wherein the first non-reactive spacer filler is a carbon black, graphite, graphene, a pigment, quartz, a carbon nanotube, or combination thereof.

Aspect 10: The composition of any one of aspects 1-9, wherein the first non-reactive spacer filler is transparent or translucent.

Aspect 11: The composition of any one of aspects 1-10, wherein the composition comprises from about 2 to about 8 parts by weight of the first non-reactive spacer filler.

Aspect 12: The composition of any one of aspects 1-11, wherein the second filler comprising one or more silanol groups is silica.

Aspect 13: The composition of any one of aspects 1-12, wherein the silica is fumed silica.

Aspect 14: The composition of any one of aspects 12 or 13, wherein the silica has a BET surface area from about 50 $m^2/g$ to about 200 $m^2/g$.

Aspect 15: The composition of any one of aspects 1-14, wherein the composition comprises from about 8 to about 14 parts by weight of the second filler comprising one or more silanol groups.

Aspect 16: The composition of any one of aspects 1-15, wherein the composition comprises a higher weight % of the first non-reactive spacer filler than the second filler comprising one or more silanol groups.

Aspect 17: The composition of any one of aspects 1-16, wherein the weight ratio of the first non-reactive spacer filler to the second filler comprising one or more silanol groups is from about 1:0.05 to about 1:20.

Aspect 18: The composition of any one of aspects 1-16, wherein the weight ratio of the first non-reactive spacer filler to the second filler comprising one or more silanol groups is from about 1:0.5 to about 1:1.

Aspect 19: The composition of any one of aspects 1-16, wherein the weight ratio of the first non-reactive spacer filler to the second filler comprising one or more silanol groups is from about 1:0.6 to about 1:0.8.

Aspect 10: The composition of any one of aspects 1-16, wherein the weight ratio of the first non-reactive spacer filler to the second filler comprising one or more silanol groups is about 1:0.67.

Aspect 21: The composition of any one of aspects 1-16, wherein the weight ratio of the first non-reactive spacer filler to the second filler comprising one or more silanol groups is from about 1:1 to about 1:10.

Aspect 22: The composition of any one of aspects 1-16, wherein the weight ratio of the first non-reactive spacer filler to the second filler comprising one or more silanol groups is from about 1:1 to about 1:7.

Aspect 23: The composition of any one of aspects 1-16, wherein the weight ratio of the first non-reactive spacer filler to the second filler comprising one or more silanol groups is from about 1:1 to about 1:5.

Aspect 24: The composition of any one of aspects 1-16, wherein the weight ratio of the first non-reactive spacer filler to the second filler comprising one or more silanol groups is from about 1:1.5 to about 1:5.

Aspect 25: The composition of any one of aspects 1-16, wherein the weight ratio of the first non-reactive spacer filler to the second filler comprising one or more silanol groups is from about 1:2 to about 1:5.

Aspect 26: The composition of any one of aspects 1-16, wherein the weight ratio of the first non-reactive spacer filler to the second filler comprising one or more silanol groups is about 1:2.8.

Aspect 27: The composition of any one of aspects 1-26, wherein the composition comprises from about 0.05 to about 0.3 parts by weight of the curing catalyst.

Aspect 28: The composition of any one of aspects 1-27, wherein the curing catalyst is selected from the group consisting of lead naphthenate, cobalt naphthenate, zinc naphthenate, sodium naphthenate, iron-2-ethylhexoate, lead 2-ethylhexoate, chromium octoate, dibutyltin dibenzoate, dibutyltin adipate, lead sebacate, dibutyltin dilactate, dibutyltindiacetate, dibutyltindilaurate, lead octoate, tin ricinoleate, cobalt hexoate, aluminum acetyl-acetonate, zirconium acetoacetate, dioctyltindimaleinate, and stannous octoate, or a combination thereof.

Aspect 29: The composition of any one of aspects 1-28, wherein the composition comprises:
a) 100 parts by weight of a fluorosilicone;
b) from about 3 to about 10 parts by weight of a silicon-based crosslinker;
c) from about 2 to about 8 parts by weight of a first non-reactive spacer filler;
d) from about 8 to about 14 parts by weight of a second filler comprising one or more silanol groups; and
e) from about 0.03 to about 0.15 parts by weight of a curing catalyst.

Aspect 30: The composition of any one of aspects 1-28, wherein the composition comprises;
a) 100 parts by weight of a fluorosilicone;
b) from about 3 to about 10 parts by weight of a silicon-based crosslinker;
c) from about 2 to about 8 parts by weight of carbon black;
d) from about 8 to about 14 parts by weight of fumed silica; and
e) from about 0.03 to about 0.15 parts by weight of a curing catalyst.

Aspect 31: The composition of claim 30, the weight ratio of carbon black to the fumed silica is from about 1:1.5 to about 1:10.

Aspect 32: The composition of any one of aspects 1-31, wherein the composition is cured.

Aspect 33: The composition of any one of aspects 1-32, wherein the composition further comprises a solvent.

Aspect 34: The composition of any one of aspects 1-33, wherein the composition is a one-part fluorosilicone composition.

Aspect 35: The composition of any one of aspects 1-34, wherein the composition does not comprise a metal oxide filler.

Aspect 36: The composition of any one of aspects 1-35, wherein the composition does not comprise an activate carbon filler.

Aspect 37: The composition of any one of aspects 1-36, wherein the composition does not comprise a filler except the first non-reactive spacer filler and the second filler comprising one or more silanol groups.

Aspect 38: The composition of any one of aspects 1-37, wherein the composition is transparent or translucent.

Aspect 39: A composition comprising:
a) 100 parts by weight of a fluorosilicone;
b) from about 2 to about 20 parts by weight of a silicon-based crosslinker;
c) a first amount of a first non-reactive spacer filler;
d) a second amount of a second filler comprising one or more silanol groups; and
e) from about 0.01 to about 5 parts by weight of a curing catalyst,
wherein the composition has a tensile strength of at least 200 psi after being exposed to 600° F. in air for 60 minutes.

Aspect 40: The composition of aspect 39, wherein the composition has an elongation of at least 300% after being exposed to 600° F. in air for 30 minutes.

Aspect 41: A kit comprising:
a) 100 parts by weight of a fluorosilicone;
b) from about 2 to about 20 parts by weight of a silicon-based crosslinker;
c) from about 0.1 to about 40 parts by weight of a first non-reactive spacer filler;
d) from about 0.1 to about 40 parts by weight of a second filler comprising one or more silanol groups; and
e) from about 0.01 to about 5 parts by weight of a curing catalyst; and
f) a container containing parts a)-e).

Aspect 42: A method comprising the steps of:
a) applying the composition of any one of aspects 1-40 to a surface; and
b) curing the applied composition.

Aspect 43: A composition comprising:
a) 100 parts by weight of a fluorosilicone;
b) from about 0.1 to about 40 parts by weight of a first non-reactive spacer filler;
c) from about 0.01 to about 5 parts by weight of a curing catalyst; and
d) from about 0.1 to about 20 parts by weight of a silanol resin and/or an untreated silica.

Aspect 44: The composition of aspect 43, wherein the composition has a tensile strength of at least 200 psi after being exposed to 600° F. in air for 60 minutes.

Aspect 45: The composition of aspect 43, wherein the composition has a tensile strength of at least 350 psi after being exposed to 600° F. in air for 30 minutes.

Aspect 46: The composition of aspect 43, wherein the composition has an elongation of at least 300% after being exposed to 600° F. in air for 30 minutes.

Aspect 47: The composition of aspect 43, wherein the fluorosilicone comprises a perfluoroalkyl polydiorganopolysiloxane.

Aspect 48: The composition of aspect 43, wherein the fluorosilicone comprises (3,3,3-trifluoropropyl)organosiloxane units.

Aspect 49: The composition of aspect 43, wherein the first non-reactive spacer filler is a carbon black, graphite, graphene, a pigment, quartz, a carbon nanotube, or combination thereof.

Aspect 50: The composition of aspect 43, wherein the first non-reactive spacer filler is transparent or translucent.

Aspect 51: The composition of aspect 43, wherein the composition further comprises a silicon-based crosslinker.

Aspect 52: The composition of aspect 51, wherein the silicon-based crosslinker comprises an alkoxysilicon compound, an acetoxysilicon compound, a ketoximosilicon compound, or a combination thereof.

Aspect 53: The composition of aspect 51, wherein the silicon-based crosslinker is methyltriacetoxysilane, ethyltriacetoxysilane, or a combination thereof.

Aspect 54: The composition of aspect 51, wherein the silicon-based crosslinker is present in an amount of from about 2 to about 20 parts by weight.

Aspect 55: The composition of aspect 51, wherein the silicon-based crosslinker is present in an amount of from about 2 to about 10 parts by weight.

Aspect 56: The composition of aspect 51, wherein the silicon-based crosslinker is present in an amount of about 5 parts by weight.

Aspect 57: The composition of aspect 43, wherein the composition further comprises a second filler comprising one or more silanol groups.

Aspect 58: The composition of aspect 57, wherein the second filler is silica.

Aspect 59: The composition of aspect 58, wherein the silica is fumed silica.

Aspect 60: The composition of aspect 58, wherein the silica has a BET surface area from about 50 $m^2/g$ to about 200 $m^2/g$.

Aspect 61: The composition of aspect 50, wherein the second filler is present in an amount of from about 0.1 to about 40 parts by weight.

Aspect 62: The composition of aspect 57, wherein the composition comprises a higher weight % of the first non-reactive spacer filler than the second filler comprising one or more silanol groups.

Aspect 63: The composition of aspect 57, wherein the weight ratio of the first non-reactive spacer filler to the second filler comprising one or more silanol groups is from about 1:0.05 to about 1:20.

Aspect 64: The composition of aspect 57, wherein the weight ratio of the first non-reactive spacer filler to the second filler comprising one or more silanol groups is from about 1:0.5 to about 1:1.

Aspect 65: The composition of aspect 57, wherein the weight ratio of the first non-reactive spacer filler to the second filler comprising one or more silanol groups is from about 1:0.6 to about 1:0.8.

Aspect 66: The composition of aspect 57, wherein the weight ratio of the first non-reactive spacer filler to the second filler comprising one or more silanol groups is about 1:0.67.

Aspect 67: The composition of aspect 57, wherein the weight ratio of the first non-reactive spacer filler to the second filler comprising one or more silanol groups is from about 1:1 to about 1:10.

Aspect 68: The composition of aspect 57, wherein the weight ratio of the first non-reactive spacer filler to the second filler comprising one or more silanol groups is from about 1:1 to about 1:7.

Aspect 69: The composition of aspect 57, wherein the weight ratio of the first non-reactive spacer filler to the second filler comprising one or more silanol groups is from about 1:1 to about 1:5.

Aspect 70: The composition of aspect 57, wherein the weight ratio of the first non-reactive spacer filler to the second filler comprising one or more silanol groups is from about 1:1.5 to about 1:5.

Aspect 71: The composition of aspect 57, wherein the weight ratio of the first non-reactive spacer filler to the second filler comprising one or more silanol groups is from about 1:2 to about 1:5.

Aspect 72: The composition of aspect 57, wherein the weight ratio of the first non-reactive spacer filler to the second filler comprising one or more silanol groups is about 1:4.

Aspect 73: The composition of aspect 43, wherein the composition comprises from about 0.05 to about 0.3 parts by weight of the curing catalyst.

Aspect 74: The composition of aspect 43, wherein the composition comprises about 0.06 parts by weight of the curing catalyst.

Aspect 75: The composition of aspect 43, wherein the curing catalyst is selected from the group consisting of lead naphthenate, cobalt naphthenate, zinc naphthenate, sodium naphthenate, iron-2-ethylhexoate, lead 2-ethylhexoate, chromium octoate, dibutyltin dibenzoate, dibutyltin adipate, lead sebacate, dibutyltin dilactate, dibutyltindiacetate, dibutyltindilaurate, lead octoate, tin ricinoleate, cobalt hexoate, aluminum acetyl-acetonate, zirconium acetoacetate, dioctyltindimaleinate, dibutyltin diacetate, and stannous octoate, or a combination thereof.

Aspect 76: The composition of aspect 43, wherein the curing catalyst is dibutyltin diacetate.

Aspect 77: The composition of aspect 43, wherein the composition comprises from about 0.1 to about 20 parts by weight of the untreated silica.

Aspect 78: The composition of aspect 43, wherein the composition comprises from about 0.1 to about 20 parts by weight of the silanol resin.

Aspect 79: The composition of aspect 78, wherein the silanol resin is a MQ resin, a DT resin, a MDQ resin, a MTQ resin, a M resin, a Q resin, a VMQ resin, or a PVMQ resin.

Aspect 80: The composition of aspect 78, wherein the silanol resin is a MQ resin.

Aspect 81: The composition of aspect 43, wherein the composition comprises from about 2 parts by weight to about 10 parts by weight of the silanol resin or the untreated silica.

Aspect 82: The composition of aspect 43, wherein the composition comprises
 a) 100 parts by weight of a fluorosilicone;
 b) from about 0.1 to about 40 parts by weight of a first non-reactive spacer filler;
 c) from about 0.03 to about 0.15 parts by weight of a curing catalyst;
 d) from about 0.1 to about 20 parts by weight of a silanol resin and/or an untreated silica.
 e) from about 3 to about 10 parts by weight of a silicon-based crosslinker; and
 f) from about 8 to about 14 parts by weight of a second filler comprising one or more silanol groups.

Aspect 83: The composition of aspect 1, wherein the composition comprises
- a) 100 parts by weight of a fluorosilicone;
- b) from about 0.1 to about 40 parts by weight of carbon black or a pigment;
- c) from about 0.03 to about 0.15 parts by weight of a curing catalyst;
- d) from about 0.1 to about 20 parts by weight of a silanol resin and/or an untreated silica;
- e) from about 3 to about 10 parts by weight of a silicon-based crosslinker; and
- f) from about 8 to about 14 parts by weight of fumed silica.

Aspect 84: The composition of aspect 43, wherein the composition is cured.

Aspect 85: The composition of aspect 43, wherein the composition further comprises a solvent.

Aspect 86: The composition of aspect 43, wherein the composition is a one-part fluorosilicone composition.

Aspect 87: The composition of aspect 43, wherein the composition does not comprise a metal oxide filler.

Aspect 88: The composition of aspect 43, wherein the composition does not comprise an activated carbon filler.

Aspect 89: The composition of aspect 43, wherein the composition does not comprise a filler except the first non-reactive spacer filler and the second filler comprising one or more silanol groups.

Aspect 90: The composition of aspect 43, wherein the composition is transparent or translucent.

Aspect 91: A composition comprising:
- a) 100 parts by weight of a fluorosilicone;
- b) a first amount of a first non-reactive spacer filler;
- c) from about 0.01 to about 5 parts by weight of a curing catalyst;
- d) a silanol resin and/or an untreated silica;
- e) from about 2 to about 20 parts by weight of a silicon-based crosslinker; and
- f) a second amount of a second filler comprising one or more silanol groups,
  wherein the composition has a tensile strength of at least 200 psi after being exposed to 600° F. in air for 60 minutes.

Aspect 92: The composition of aspect 91, wherein the composition has an elongation of at least 300% after being exposed to 600° F. in air for 30 minutes.

Aspect 93: A kit comprising:
- a) 100 parts by weight of a fluorosilicone;
- b) from about 0.1 to about 40 parts by weight of a first non-reactive spacer filler;
- c) from about 0.01 to about 5 parts by weight of a curing catalyst;
- d) from about 0.1 to about 20 parts by weight of a silanol resin and/or an untreated silica; and
- e) a container containing parts a)-e).

Aspect 94: The kit of aspect 93, further comprising one or more selected from:
- a) from about 3 to about 10 parts by weight of a silicon-based crosslinker; and
- b) from about 8 to about 14 parts by weight of a second filler comprising one or more silanol groups.

Aspect 95: A method comprising the steps of:
- a) applying the composition of any one of aspects 43-92 to a surface; and
- b) curing the applied composition.

E. EXAMPLES

The following examples are put forth so as to provide those of ordinary skill in the art with a complete disclosure and description of how the compounds, compositions, articles, devices, and/or methods described and aspected herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

1. Example 1

Provided herein is a working example of the composition disclosed herein.

A cured composition (Composition A) within the scope of the composition disclosed herein was made with the components shown in Table 1 below. Composition A was prepared over one year prior to testing.

TABLE 1

| Composition A | | |
|---|---|---|
| COMPONENT | AMOUNT (Part by Weight) | AMOUNT (% by Weight) |
| Linear polysiloxane with 100% mol of the back bone consisting of trifluoropropylmethylsiloxy units and terminated with dimethylsilanol groups in a viscosity range of 40,000 to 60,000 cP (fluorosilicone) | 100 | 82.3 |
| Ethyltriacetoxysilane (silicon-based crosslinker) | 4.7 | 3.3 |
| Methyltriacetoxysilane (silicon-based crosslinker) | 2.0 | 1.4 |
| Carbon black (first non-reactive spacer filler) | 9.6 | 7.9 |
| Fumed silica (second filler comprising one or more silanol groups) | 6.0 | 5.0 |
| Dibutyltin diacetate (curing catalyst) | 0.08 | 0.1 |

A cured control composition was also made from FS3-3730, which is a commercially available fluorosilicone composition from Avantor. FS3-3730 does not include carbon black as a filler, but does include fumed silica. FS3-3730 is identical to Composition A except for the inclusion of the carbon black.

FIG. 1 shows a thermogravimetric analysis/mass spectrometer (TGA/MS) analysis of FS3-3730. The 91 AMU line is the mass loss associated with polycondensation mechanism and the 236 AMU line is the mass loss associated with the polymer digestion mechanism. As shown in FIG. 1, the onset of the degradation of the two mechanisms start at different temperatures. The mass loss associated with the polycondensation mechanism, shown by the 91 AMU line, starts at a significant lower temperature (~250° C.), as compared to the mass loss associated with the polymer digestion mechanism, shown by the 236 AMU line. Thus, in FS3-3730, which only contains fumed silica as the filler, the polycondensation mechanism and polymer digestion mechanism are not balanced, which results in poor thermal stability of the FS3-3730 sample.

Figure 2:
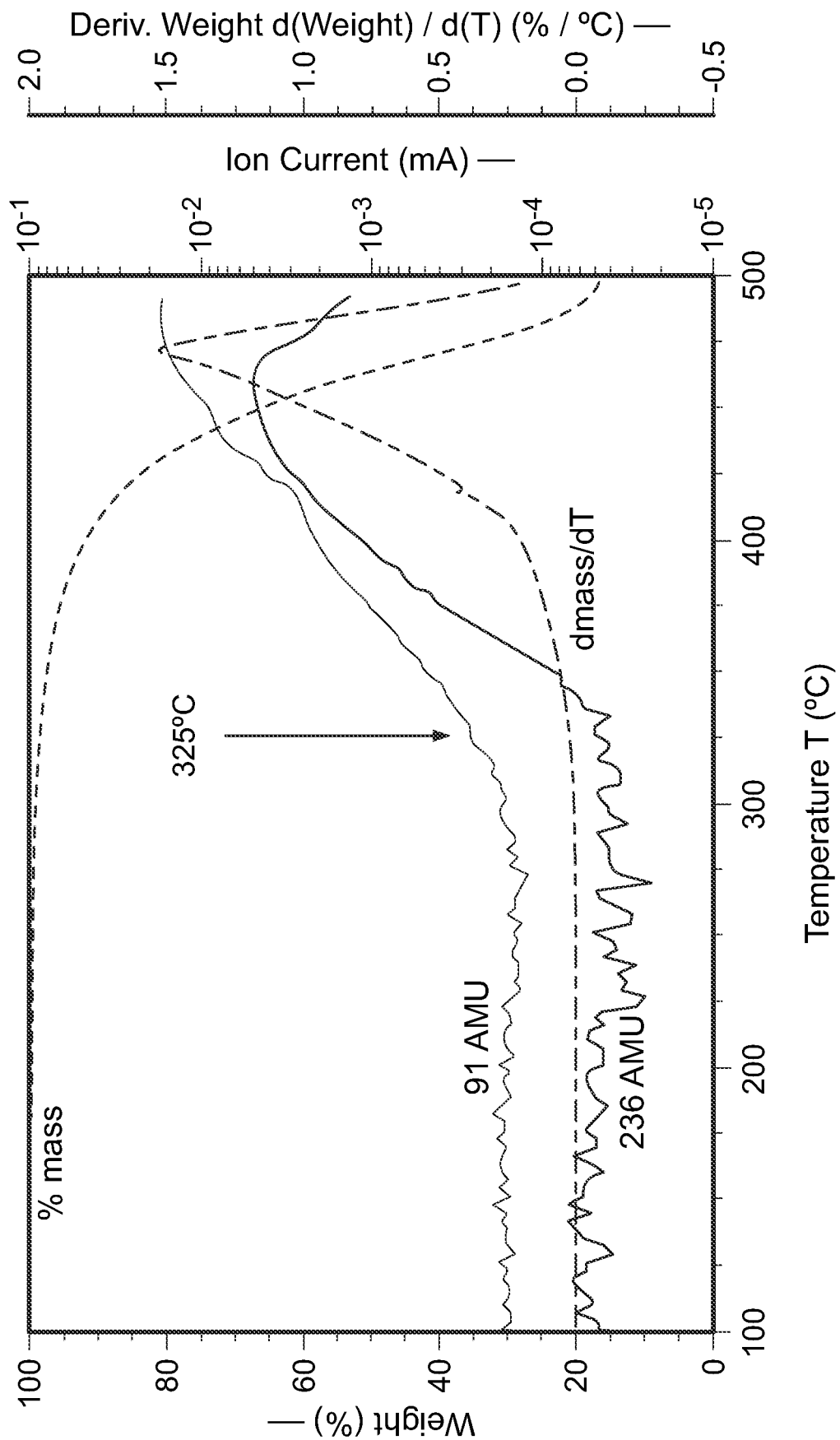
FIG. 2 shows a TGA/MS analysis of Composition A described in Example 1.

FIG. 2 shows a TGA/MS analysis of Composition A (shown in Table 1). As shown in FIG. 1, the onset of the degradation of the polycondensation mechanism, shown by the 91 AMU line, and the polymer digestion mechanism, shown by the 236 AMU line, start at essentially the same temperature (~325° C.). Thus, the onset of degradation is significantly higher in Composition A, as compared to FS3-3730. Furthermore, the polycondensation mechanism, shown by the 91 AMU line, and the polymer digestion mechanism, shown by the 236 AMU line, are balanced in Composition A.

Figure 3:
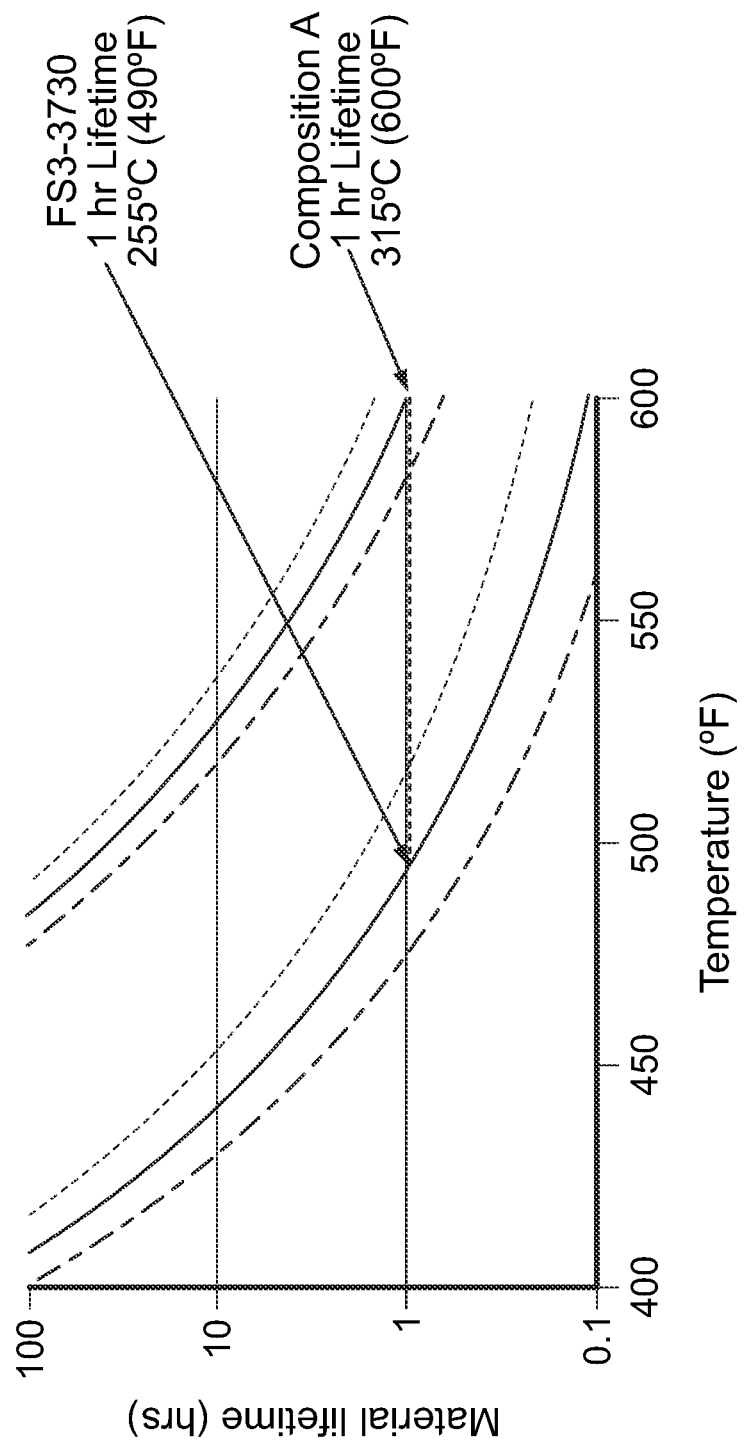
FIG. 3 shows a lifetime analysis of Composition A described in Example 1 and FS3-3730.

FIG. 3 shows a lifetime study of Composition A and FS3-3730. The data shows that Composition A can withstand about 60° C. higher temperature (~315° C. vs. ~255° C.) than FS3-3730. This data correlates with the TGA/MS data shown in FIGS. 1 and 2. The lifetime data shown in FIG. 3 is determined when the tensile strength is less than 50% of the original tensile strength.

Figure 4:
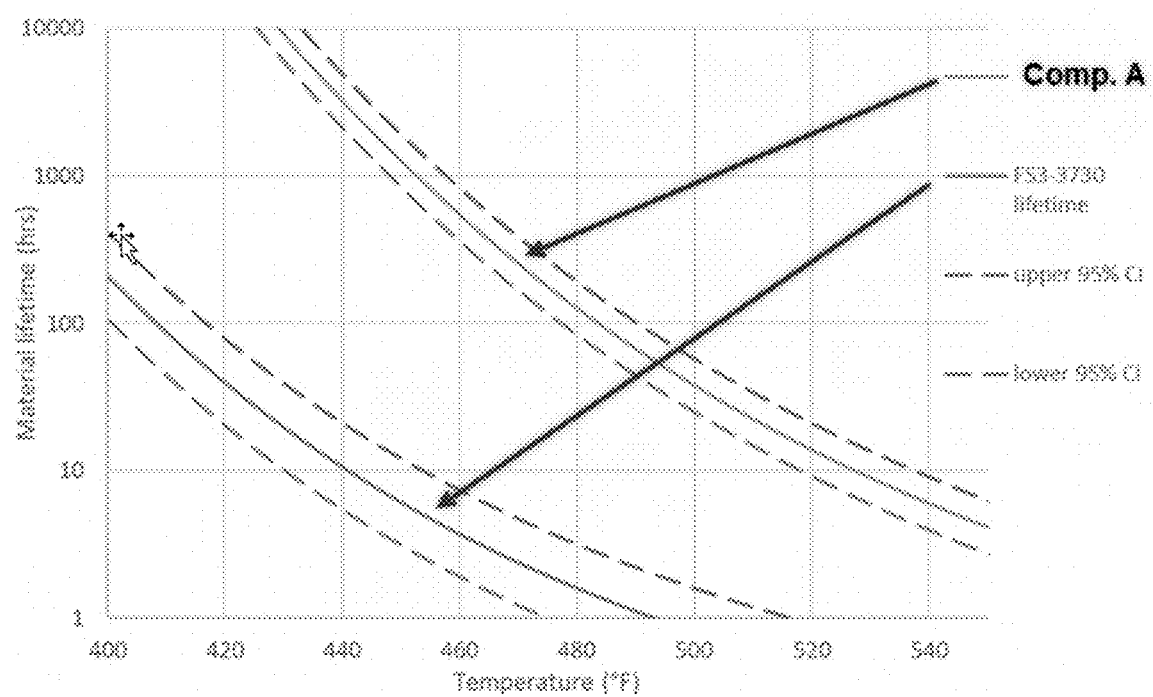
FIG. 4 shows a lifetime analysis of Composition A described in Example 1 and FS3-3730.

FIG. 4 shows predicted lifetime data of Composition A and FS3-3730. The predicted data shows that Composition A is more stable than FS3-3730 at all tested temperatures.

Table 2 shows a summary of physical properties of Composition A and FS3-3730. Table 3 shows that the lifetime of Composition A is about 100 times that of FS3-3730 at 250° C.

TABLE 2

| Property | Composition A | FS3-3730 |
| --- | --- | --- |
| Lifetime at 250° C. (min) | 110 min | 1.48 min |
| Tensile strength (psi) | 550-800 psi | 800-1300 psi |
| Tear strength (psi) | 55-70 psi | 70-75 |
| Elongation (%) | 300%-350% | 400%-450% |
| Duro (A) | 35-37 | 36 |
| Swell % (JP8 soak) | 5%-6% | 5.50% |
| Extrusion rate (g/min @ 90 psi, 1/8" tip) | 30-40 | 180-200 |
| Lap shear (psi) | 60-140 psi | 80-260 psi |

Figure 5:
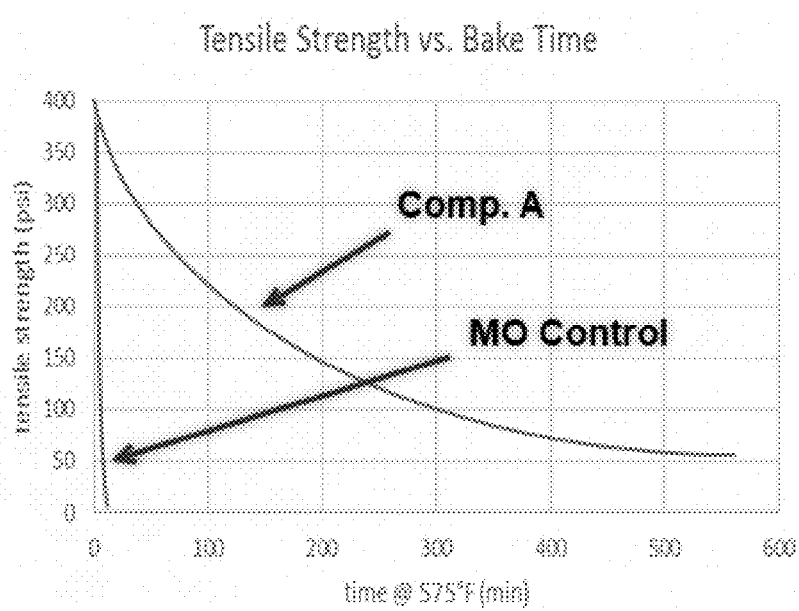
FIG. 5 shows a tensile strength analysis over time of Composition A described in Example 1 and a fluorosilicone composition having a metal oxide filler.

Metal oxides are commonly used as fillers in fluorosilicone compositions. FIG. 5 compares the tensile strength of Composition A to a conventional fluorosilicone composition with a metal oxide filler (MO control). As shown in FIG. 5, Composition A retains tensile strength over time at 575° F., while the conventional fluorosilicone composition with metal oxide filler almost immediately degrades and loses all tensile strength.

The ratio of carbon black (first non-reactive spacer filler) and fumed silica (second filler comprising one or more silanol groups) was altered in Composition A. The data in Table 3 below was collected after 3 hours of exposure at 300° C. Table 4 shows that the ratio of carbon black (first non-reactive spacer filler) to fumed silica (second filler comprising one or more silanol groups) is critical to the retention of tensile strength. Only Composition A, as described above, had a measureable tensile strength after 3 hours of exposure at 300° C. All other composition degraded to the point where the tensile strength could not be measured.

TABLE 3

| Compositions | Measurable Tensile Strength after 3 hours of exposure to 300° C. |
| --- | --- |
| Composition A (60/40 ratio of carbon black to fumed silica) | Yes (230 psi) |
| Modified Composition A (99/1 ratio of carbon black to fumed silica) | No |
| Modified Composition A (95/5 ratio of carbon black to fumed silica) | No |
| Modified Composition A (90/10 ratio of carbon black to fumed silica) | No |
| Modified Composition A (75/25 ratio of carbon black to fumed silica) | No |
| Modified Composition A (70/30 ratio of carbon black to fumed silica) | No |
| Modified Composition A (65/35 ratio of carbon black to fumed silica) | No |
| Modified Composition A (50/50 ratio of carbon black to fumed silica) | No |
| Modified Composition A (33/66 ratio of carbon black to fumed silica) | No |
| Modified Composition A (25/75 ratio of carbon black to fumed silica) | No |

2. Example 2

Figure 6:
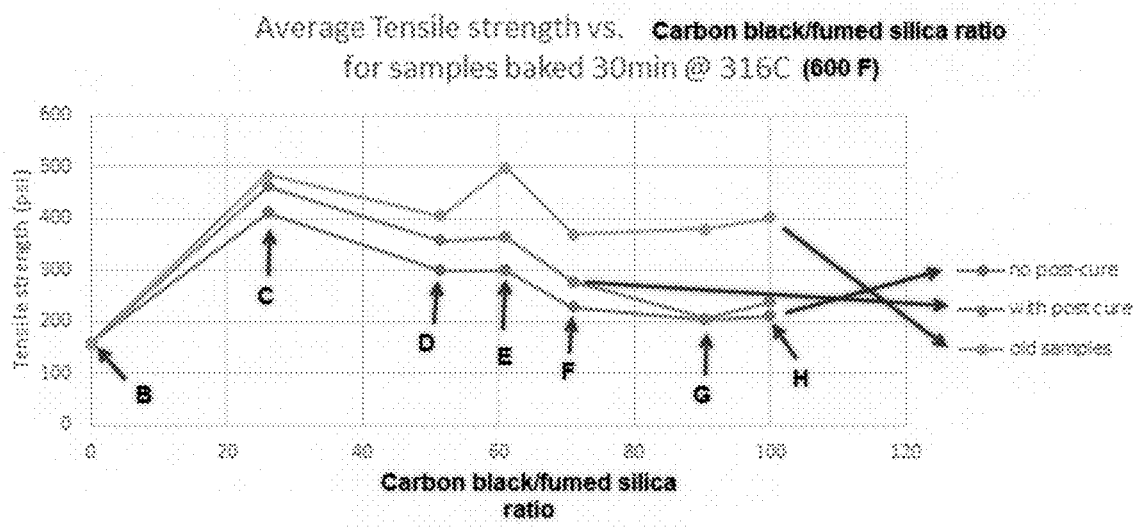
FIG. 6 shows a tensile strength analysis vs. carbon black/fumed silica ratio for Compositions B-H.

Cured compositions (Compositions B-H) within the scope of the composition disclosed herein were made with the components shown in Table 4 below. Compositions B-H were tested two ways as shown in FIG. 6: 1. No post-cure, which are samples that are allowed to cure for 7 days at 25° C. at 50% humidity; and 2. Post-cure, which are samples that are cured in an oven for 7 hours at 150° C.

The data in FIG. 6 shows that Composition C has the highest tensile strength for the no post-cure and post-cure samples, which indicates a balance of the carbon black (first non-reactive spacer filler) and Fumed silica (second filler comprising one or more silanol groups) in the composition to control the thermal degradation of the composition.

TABLE 4

Compositions B-H

AMOUNT (Part by Weight)-AMOUNT (% by Weight)

| COMPONENT | B | C | D | E (old sample correspond to Composition A) | F | G | H |
|---|---|---|---|---|---|---|---|
| Linear polysiloxane with 100% mol of the back bone consisting of trifluoropropylmethylsiloxy units and terminated with dimethylsilanol groups in a viscosity range of 40,000 to 60,000 cP (fluorosilicone) | 100-82.2% | 100-82% | 100-81.8% | 100-81.7% | 100 81.7% | 100 81.5% | 100-81.5% |
| Ethyltriacetoxysilane (silicon-based crosslinker) | 4.6 3.8% | 4.6 3.8% | 4.7 3.8% | 4.7 3.8% | 4.7 3.8% | 4.7 3.8% | 4.7 3.8% |
| Methyltriacetoxysilane (silicon-based crosslinker) | 2-1.6% | 2.0-1.6% | 2.0-1.6% | 2.0 1.6% | 2.0 1.6% | 2.0-1.6% | 2.0-1.6% |
| Carbon black (first non-reactive spacer filler) | 0 | 4-3.3% | 8-6.5% | 9.6-7.8% | 11.2-9.1% | 14.4-11.7% | 16-13.0% |
| Fumed silica (second filler comprising one or more silanol groups) | 15-12.3% | 11.3 9.2% | 7.5-6.2% | 6-4.9% | 4.5 3.7% | 1.5-1.2% | 0 |
| Dibutyltin diacetate (curing catalyst) | 0.08-0.07% | 0.08-0.07% | 0.08-0.07% | 0.08 0.07% | 0.08-0.07% | 0.08-0.07% | 0.08-0.07% |

FIG. 6 also shows data for "old samples", which are samples that were tested more than a year after being cured. Composition E old sample corresponds to Composition A. There is a general trend that the old samples have a higher tensile strength than the freshly prepared and tested samples.

3. Example 3

Exemplary compositions (Compositions 1-8) within the scope of the composition disclosed herein were made with the components shown in Tables 5 and 6 below. Briefly, the samples were mixed thoroughly per the formula, alternating hand mixing with 30 s on a speed mixer at 3000 rpm, until the bases were totally mixed. Next, the crosslinker/catalyst was added, and knife coat slabs were made (sandwiched between the acetate sheet and 1400 mesh). The material was then allowed to cure for 3 days at ambient temperature. After the first day, the sheeting was removed to allow the material to breathe. A post-cure was performed on the slab after the third day (i.e., 150° C. for 3 hours). The slabs were cut into as many viable tensile bars as possible. For each material, the bars were cut in half. TGA/MS was analyzed using one half, while the other half was placed into a preheated high temperature oven at 316° C. for 30 minutes. Tensile, elongation, and durometer were then evaluated as described elsewhere herein.

TABLE 5

| Description | ppH | mass (%) |
|---|---|---|
| 55k, 15 ppH Silica Base | | |
| OHFMeEB Fme 55k | 100 | 86.96 |
| AEROSIL R202 treated fumed silica | 15 | 13.04 |
| 55k, 16 ppH Carbon Base | | |
| OHFMeEB Fme 55k | 100 | 86.20 |
| Carbon black | 16 | 13.80 |

Table 5 describes the "55k, 16 ppH carbon base" and "55k, 15 ppH silica base" shown in Compositions 1-8 in Table 6. OHFMeEB Fme 55k is a silanol terminated poly(3,3,3-trifluoropropylmethylsiloxane) with a viscosity of ~55 k cP at room temperature and is the fluorosilicone in the compositions. The parts per weight of the components in Compositions 1-8 relative to the fluorosilicone can be calculated in compositions 1-8 with the information in Tables 5 and 6.

TABLE 6

| Description | ppH | mass (g) |
|---|---|---|
| Composition 1 FS 95% silica/5% carbon | | |
| 55k, 16 pph carbon base | 5 | 5 |
| 55k, 15 ppH silica base | 95 | 95 |
| Ethyltriacetoxysilane | 3.5 | 3.50 |
| Methyltriacetoxysilane | 1.5 | 1.50 |
| dibutyltin diacetate | 0.06 | 0.06 |
| Composition 2 FS 90% silica/10% carbon | | |
| 55k, 16 pph carbon base | 10 | 10 |
| 55k, 15 ppH silica base | 90 | 90 |

TABLE 6-continued

| Description | ppH | mass (g) |
|---|---|---|
| Ethyltriacetoxysilane | 3.5 | 3.50 |
| Methyltriacetoxysilane | 1.5 | 1.50 |
| Composition 3 FS 85% silica/15% carbon | | |
| 55k, 16 pph carbon base | 15 | 15 |
| 55k, 15 ppH silica base | 85 | 85 |
| Ethyltriacetoxysilane | 3.5 | 3.50 |
| Methyltriacetoxysilane | 1.5 | 1.50 |
| dibutyltin diacetate | 0.06 | 0.06 |
| Composition 4 FS 80% silica/20% carbon | | |
| 55k, 16 pph carbon base | 20 | 20 |
| 55k, 15 ppH silica base | 80 | 80 |
| Ethyltriacetoxysilane | 3.5 | 3.50 |
| Methyltriacetoxysilane | 1.5 | 1.50 |
| dibutyltin diacetate | 0.06 | 0.06 |
| Composition 5 FS 70% silica/30% carbon | | |
| 55k, 16 pph carbon base | 30 | 30 |
| 55k, 15 ppH silica base | 70 | 70 |
| Ethyltriacetoxysilane | 3.5 | 3.50 |
| Methyltriacetoxysilane | 1.5 | 1.50 |
| dibutyltin diacetate | 0.06 | 0.06 |
| Composition 6 FS 60% silica/40% carbon | | |
| 55k, 16 pph carbon base | 40 | 40 |
| 55k, 15 ppH silica base | 60 | 60 |
| Ethyltriacetoxysilane | 3.5 | 3.50 |
| Methyltriacetoxysilane | 1.5 | 1.50 |
| dibutyltin diacetate | 0.06 | 0.06 |
| Composition 7 FS 40% silica/60% carbon | | |
| 55k, 16 pph carbon base | 60 | 60 |
| 55k, 15 ppH silica base | 40 | 40 |
| Ethyltriacetoxysilane | 3.5 | 3.50 |
| Methyltriacetoxysilane | 1.5 | 1.50 |
| dibutyltin diacetate | 0.06 | 0.06 |
| Composition 8 FS 20% silica/80% carbon | | |
| 55k, 16 pph carbon base | 80 | 80 |
| 55k, 15 ppH silica base | 20 | 20 |
| Ethyltriacetoxysilane | 3.5 | 3.50 |
| Methyltriacetoxysilane | 1.5 | 1.50 |
| dibutyltin diacetate | 0.06 | 0.06 |

Figure 7:
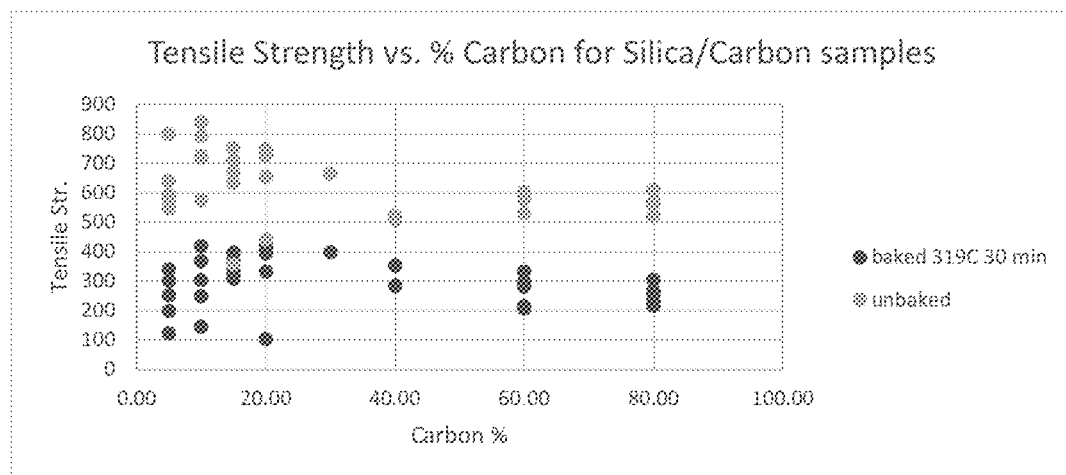
FIG. 7 shows a tensile strength analysis vs. carbon/silica ratio for Compositions 1-8.

The data in Table 7 and FIG. 7 shows that the degradation mechanisms can be balanced by controlling the ratio of the fillers. As illustrated below, compositions containing a range of about 15-40% carbon and about 60-85% silica offer excellent tensile strength.

TABLE 7

| Composition No. | Initial Tensile (psi) | Standard Deviation | Baked Tensile* (psi) | Standard Deviation | % Tensile |
|---|---|---|---|---|---|
| 1 | 630.4 | 100.1913 | 242.4 | 74.67463 | 0.615482 |
| 2 | 730.8 | 100.4425 | 296.2 | 105.89 | 0.594691 |
| 3 | 623.2 | 155.3696 | 345.8 | 36.54723 | 0.445122 |
| 4 | 659.6 | 127.4845 | 331.8 | 132.4149 | 0.496968 |
| 5 | 681.5 | 23.33452 | 345.2 | 195.6047 | 0.49347 |
| 6 | 513 | 9.899495 | 347.6 | 36.52807 | 0.322417 |
| 7 | 582 | 29.63106 | 265.4 | 53.83586 | 0.543986 |
| 8 | 565.6 | 31.38152 | 254.6 | 34.17309 | 0.549859 |

*Baked at 316° C. for 30 minutes.

4. Example 4

Comparative Composition 9 and exemplary compositions (Compositions 10-15) within the scope of the composition disclosed herein were made with the components shown in Tables 8 and 9 below. Unlike the exemplary compositions, comparative Composition 9 does not include a non-reactive spacer filler (e.g., carbon black, cinilex red, etc.) as described herein.

Briefly, the samples were mixed thoroughly per the formula, alternating hand mixing with 30 s on a speed mixer at 3000 rpm, until the bases were totally mixed. Next, the crosslinker/catalyst was added, and knife coat slabs were made (sandwiched between the acetate sheet and 1400 mesh). The material was then allowed to cure for 3 days at ambient temperature. After the first day, the sheeting was removed to allow the material to breathe. A post-cure was performed on the slab after the third day (i.e., 150° C. for 3 hours). The slabs were cut into as many viable tensile bars as possible. Three tensile bars per material were evaluated for tensile strength, elongation, and durometer hardness. The remaining tensile bars were divided into groups and put into a preheated high temperature oven at 316° C. Samples were removed at 15 minutes, 30 minutes, 50 minutes, 90 minutes, and 180 minutes.

TABLE 8

High treat silica FS base OHeb

| Description | ppH | mass (g) | mass (%) |
|---|---|---|---|
| FMe poly 55k OHeb | 100 | 3653 | 90.09 |
| Evonik aerosil R812-S double treatment silica | 11 | 402 | 9.91 |

Table 8 describes the "high treat silica FS base OHeb" shown in Compositions 9-15 in Table 9. FMe poly 55k OHeb is the fluorosilicone in the compositions. The parts per weight of the components in Compositions 9-15 relative to the fluorosilicone can be calculated in compositions 9-15 with the information in Tables 8 and 9.

TABLE 9

| Description | ppH | mass (g) |
|---|---|---|
| Composition 9 HTSR high treat silica | | |
| high treat silica FS base OHeb | 100 | 100 |
| Ethyltriacetoxysilane | 3.5 | 3.5 |
| Methyltriacetoxysilane | 1.5 | 1.5 |
| dibutyltin diacetate | 0.06 | 0.06 |
| Composition 10 HTSR high treat silica: white-low | | |
| high treat silica FS base OHeb | 100 | 100 |
| TiO₂ white pigment | 10 | 10 |
| ethyltriacetoxysilane | 3.5 | 3.5 |
| methyltriacetoxysilane | 1.5 | 1.5 |
| dibutyltin diacetate | 0.06 | 0.06 |
| Composition 11 HTSR high treat silica: white-high | | |
| high treat silica FS base OHeb | 100 | 100 |
| TiO₂ white pigment | 25 | 25 |
| ethyltriacetoxysilane | 3.5 | 3.5 |

TABLE 9-continued

| Description | ppH | mass (g) |
|---|---|---|
| methyltriacetoxysilane | 1.5 | 1.5 |
| dibutyltin diacetate | 0.06 | 0.06 |
| Composition 12 | | |
| HTSR high treat silica: blue-low | | |
| high treat silica FS base OHeb | 100 | 100 |
| ferro blue pigment | 10 | 10 |
| ethyltriacetoxysilane | 3.5 | 3.5 |
| methyltriacetoxysilane | 1.5 | 1.5 |
| dibutyltin diacetate | 0.06 | 0.06 |
| Composition 13 | | |
| HTSR high treat silica: blue-high | | |
| high treat silica FS base OHeb | 100 | 100 |
| ferro blue pigment | 25 | 25 |
| ethyltriacetoxysilane | 3.5 | 3.5 |
| methyltriacetoxysilane | 1.5 | 1.5 |
| dibutyltin diacetate | 0.06 | 0.06 |
| Composition 14 | | |
| HTSR high treat silica: red-low | | |
| high treat silica FS base OHeb | 100 | 100 |
| cinilex red pigment | 10 | 10 |
| ethyltriacetoxysilane | 3.5 | 3.5 |
| methyltriacetoxysilane | 1.5 | 1.5 |
| dibutyltin diacetate | 0.06 | 0.06 |
| Composition 15 | | |
| HTSR high treat silica: red-high | | |
| high treat silica FS base OHeb | 100 | 100 |
| cinilex red pigment | 25 | 25 |
| ethyltriacetoxysilane | 3.5 | 3.5 |
| methyltriacetoxysilane | 1.5 | 1.5 |
| dibutyltin diacetate | 0.06 | 0.06 |

The data in Table 10 shows that a variety of different non-reactive spacer fillers are well-tolerated. As illustrated in Table 9 above and Table 10 below, titanium dioxide, ferro blue, and cinilex red fillers were evaluated at both low (10 ppH) and high (25 ppH) loading.

TABLE 10

| | Initial | | Tensile Strength (psi) after given time at 316° C. | | |
|---|---|---|---|---|---|
| Composition No. | Tensile (psi) | Standard Deviation | 15 min average | 30 min average | 50 min average |
| 9* | 772 | 47 | 106 | 86 | 67 |
| 10 | 618 | 89 | 0 | 0 | 0 |
| 11 | 630 | 46 | 26 | 0 | 0 |
| 12 | 522 | 27 | 88 | 37 | 0 |
| 13 | 556 | 54 | 301 | 107 | 0 |
| 14 | 656 | 106 | 0 | 0 | 0 |
| 15 | 509 | 58 | 0 | 0 | 0 |
| FS3-3730* | 687 | 33 | 98 | 78 | 0 |

Figure 8:
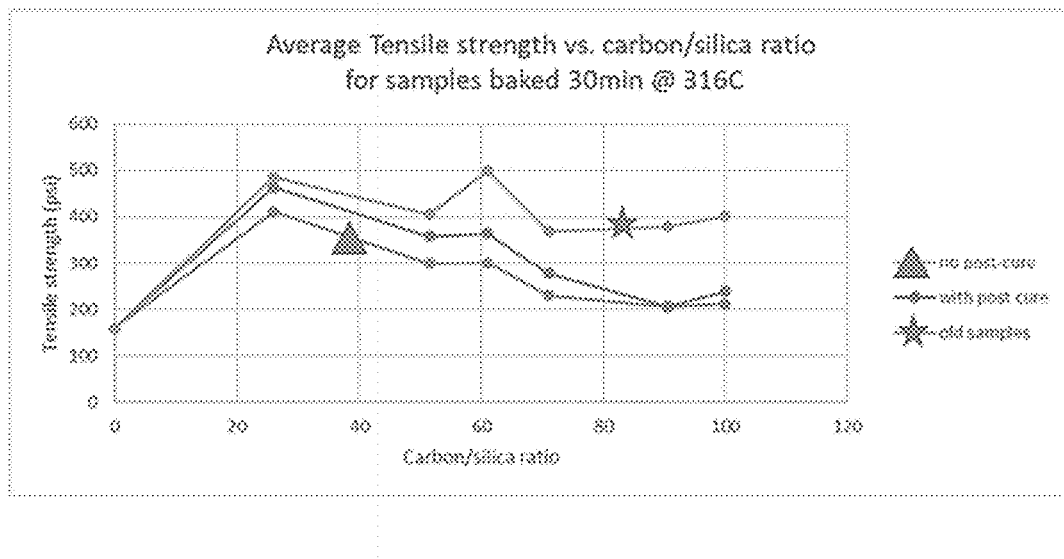
FIG. 8 shows a tensile strength analysis vs. carbon/silica ratio for FS3-3730, Compositions 6 and 14, 100, and 101.

The data in FIG. 8 and Table 11 illustrate that the degradation mechanisms can be balanced across a range of formulations, and that a variety of different silica/carbon ratios are tolerated. As shown below, both exemplary Composition 6, which contains carbon black, and exemplary Composition 14, which contains cinilex red, offer improvements in tensile strength compared to control composition FS3-3730, which does not include a non-reactive spacer filler as defined herein.

TABLE 11

| Composition No. | Raw Tensile (psi) | Standard Deviation | Baked Tensile (psi) | Standard Deviation |
|---|---|---|---|---|
| FS3-3730 | 766 | 27 | 20 (est) | 5 (est) |
| 6 | 808 (est) | 46 (est) | 411.5 | 34 |
| 14 | 563 | 92 | 255 | 42 |
| 100 | 691 | 52 | 392 | 68 |
| 101 | 620 | 10 | 441 | 18 |

5. Example 5

Exemplary compositions (Compositions 16-32) within the scope of the composition disclosed herein were made with the components shown in Tables 12 and 13 below. Briefly, the samples were mixed thoroughly per the formula, alternating hand mixing with 30 s on a speed mixer at 3000 rpm, until the bases were totally mixed. Next, the cross-linker/catalyst was added, and knife coat slabs were made (sandwiched between the acetate sheet and 1400 mesh). The material was then allowed to cure for 3 days at ambient temperature. After the first day, the sheeting was removed to allow the material to breathe. A post-cure was performed on the slab after the third day (i.e., 150° C. for 3 hours). The slabs were cut into as many viable tensile bars as possible. Three tensile bars per material were evaluated for tensile strength, elongation, and durometer hardness. The remaining tensile bars were divided into groups and put into a preheated high temperature oven at 316° C. Samples were removed at 15 minutes, 30 minutes, 50 minutes, 90 minutes, and 180 minutes. In Table 12 "RES-4600" is a methyl silicone resin with Si—OH functionalities.

TABLE 12

| High treat silica FS base OHeb | | | |
|---|---|---|---|
| Description | ppH | mass (g) | mass (%) |
| FMe poly 55k OHeb | 100 | 3653 | 90.09 |
| Evonik aerosil R812-S double treatment silica | 11 | 402 | 9.91 |

Table 12 describes the "high treat silica FS base OHeb" shown in Compositions 16-32 in Table 13. FMe poly 55k OHeb is the fluorosilicone in the compositions. The parts per weight of the components in Compositions 16-32 relative to the fluorosilicone can be calculated in compositions 16-32 with the information in Tables 12 and 13.

TABLE 13

| Description | ppH | mass (g) |
|---|---|---|
| Composition 16 | | |
| HTSR high treat silica: white - lower | | |
| high treat silica FS base OHeb | 100 | 100 |
| TiO$_2$ white pigment | 5 | 5 |
| ethyltriacetoxysilane | 3.5 | 3.5 |
| methyltriacetoxysilane | 1.5 | 1.5 |
| dibutyltin diacetate | 0.06 | 0.06 |
| Composition 17 | | |
| HTSR high treat silica: white - lowest | | |
| high treat silica FS base OHeb | 100 | 100 |
| TiO$_2$ white pigment | 2 | 2 |
| ethyltriacetoxysilane | 3.5 | 3.5 |

TABLE 13-continued

| Description | ppH | mass (g) |
|---|---|---|
| methyltriacetoxysilane | 1.5 | 1.5 |
| dibutyltin diacetate | 0.06 | 0.06 |
| Composition 18 | | |
| HTSR high treat silica: blue - lower | | |
| high treat silica FS base OHeb | 100 | 100 |
| ferro blue pigment | 5 | 5 |
| ethyltriacetoxysilane | 3.5 | 3.5 |
| methyltriacetoxysilane | 1.5 | 1.5 |
| dibutyltin diacetate | 0.06 | 0.06 |
| Composition 19 | | |
| HTSR high treat silica: blue - lowest | | |
| high treat silica FS base OHeb | 100 | 100 |
| ferro blue pigment | 2 | 2 |
| ethyltriacetoxysilane | 3.5 | 3.5 |
| methyltriacetoxysilane | 1.5 | 1.5 |
| dibutyltin diacetate | 0.06 | 0.06 |
| Composition 20 | | |
| HTSR high treat silica: red - lower | | |
| high treat silica FS base OHeb | 100 | 100 |
| cinilex red pigment | 5 | 5 |
| ethyltriacetoxysilane | 3.5 | 3.5 |
| methyltriacetoxysilane | 1.5 | 1.5 |
| dibutyltin diacetate | 0.06 | 0.06 |
| Composition 21 | | |
| HTSR high treat silica: red - lowest | | |
| high treat silica FS base OHeb | 100 | 100 |
| cinilex red pigment | 2 | 2 |
| ethyltriacetoxysilane | 3.5 | 3.5 |
| methyltriacetoxysilane | 1.5 | 1.5 |
| dibutyltin diacetate | 0.06 | 0.06 |
| Composition 22 | | |
| HTSR untreated silica - low | | |
| high treat silica FS base OHeb | 100 | 100 |
| $TiO_2$ white pigment | 10 | 10 |
| untreated fumed silica | 2 | 2 |
| ethyltriacetoxysilane | 3.5 | 3.5 |
| methyltriacetoxysilane | 1.5 | 1.5 |
| dibutyltin diacetate | 0.06 | 0.06 |
| Composition 23 | | |
| HTSR untreated silica - mid | | |
| high treat silica FS base OHeb | 100 | 100 |
| $TiO_2$ white pigment | 10 | 10 |
| untreated fumed silica | 5 | 2 |
| ethyltriacetoxysilane | 3.5 | 3.5 |
| methyltriacetoxysilane | 1.5 | 1.5 |
| dibutyltin diacetate | 0.06 | 0.06 |
| Composition 24 | | |
| HTSR untreated silica - high | | |
| high treat silica FS base OHeb | 100 | 100 |
| $TiO_2$ white pigment | 10 | 10 |
| untreated fumed silica | 10 | 2 |
| ethyltriacetoxysilane | 3.5 | 3.5 |
| methyltriacetoxysilane | 1.5 | 1.5 |
| dibutyltin diacetate | 0.06 | 0.06 |
| Composition 25 | | |
| HTSR resin - low | | |
| high treat silica FS base OHeb | 100 | 100 |
| $TiO_2$ white pigment | 10 | 10 |
| RES-4600 | 2 | 2 |
| ethyltriacetoxysilane | 3.5 | 3.5 |
| methyltriacetoxysilane | 1.5 | 1.5 |
| dibutyltin diacetate | 0.06 | 0.06 |
| Composition 26 | | |
| HTSR resin - mid | | |
| high treat silica FS base OHeb | 100 | 100 |
| $TiO_2$ white pigment | 10 | 10 |
| RES-4600 | 5 | 2 |
| ethyltriacetoxysilane | 3.5 | 3.5 |
| methyltriacetoxysilane | 1.5 | 1.5 |
| dibutyltin diacetate | 0.06 | 0.06 |
| Composition 27 | | |
| HTSR resin - high | | |
| high treat silica FS base OHeb | 100 | 100 |
| $TiO_2$ white pigment | 10 | 10 |
| RES-4600 | 10 | 10 |
| ethyltriacetoxysilane | 3.5 | 3.5 |
| methyltriacetoxysilane | 1.5 | 1.5 |
| dibutyltin diacetate | 0.06 | 0.06 |
| Composition 28 | | |
| HTSR high treat silica: blue - lower | | |
| high treat silica FS base OHeb | 100 | 100 |
| ferro blue pigment | 5 | 5 |
| RES-4600 | 2 | 2 |
| ethyltriacetoxysilane | 3.5 | 3.5 |
| methyltriacetoxysilane | 1.5 | 1.5 |
| dibutyltin diacetate | 0.06 | 0.06 |
| Composition 29 | | |
| HTSR high treat silica: blue - lower | | |
| high treat silica FS base OHeb | 100 | 100 |
| ferro blue pigment | 5 | 5 |
| RES-4600 | 4 | 4 |
| ethyltriacetoxysilane | 3.5 | 3.5 |
| methyltriacetoxysilane | 1.5 | 1.5 |
| Composition 30 | | |
| HTSR high treat silica: blue - lower | | |
| high treat silica FS base OHeb | 100 | 100 |
| ferro blue pigment | 5 | 5 |
| untreated fumed silica | 2 | 2 |
| ethyltriacetoxysilane | 3.5 | 3.5 |
| methyltriacetoxysilane | 1.5 | 1.5 |
| dibutyltin diacetate | 0.06 | 0.06 |
| Composition 31 | | |
| HTSR high treat silica: white - lowest | | |
| high treat silica FS base OHeb | 100 | 100 |
| $TiO_2$ white pigment | 6.5 | 6.5 |
| ethyltriacetoxysilane | 3.5 | 3.5 |
| methyltriacetoxysilane | 1.5 | 1.5 |
| dibutyltin diacetate | 0.06 | 0.06 |
| Composition 32 | | |
| HTSR high treat silica: white - lowest | | |
| high treat silica FS base OHeb | 100 | 100 |
| $TiO_2$ white pigment | 8.5 | 8.5 |
| Ethyltriacetoxysilane | 3.5 | 3.5 |
| methyltriacetoxysilane | 1.5 | 1.5 |
| dibutyltin diacetate | 0.06 | 0.06 |

The data in Table 14 shows that the addition of untreated silica or a silanol resin can be used to shift the degradation mechanism (e.g., from soft to brittle).

TABLE 14

| Composition No. | Description | Fail Type | Initial Tensile (psi) | Standard Deviation |
|---|---|---|---|---|
| 16 | TiO2 5 ppH | Brittle | 618 | 113 |
| 17 | TiO2 2 ppH | Brittle | 620 | 124 |
| 18 | Ferro Blue 5 ppH | Soft | 424 | 152 |
| 19 | Ferro Blue 2 ppH | Soft | 498 | 92 |
| 20 | Cinilex red 5 ppH | Soft | 366 | 170 |
| 21 | Cinilex red 2 ppH | Soft | 323 | 51 |
| 22 | untreated silica 2 ppH | brittle | 637 | 135 |
| 23 | untreated silica 5 ppH | — | | |
| 24 | untreated silica 10 ppH | — | | |
| 25 | resin 2 ppH | brittle | 458 | 71 |
| 26 | resin 5 ppH | brittle | 437 | 92 |

TABLE 14-continued

| Composition No. | Description | Fail Type | Initial Tensile (psi) | Standard Deviation |
|---|---|---|---|---|
| 27 | resin 10 ppH | brittle | 537 | 23 |
| 28 | Blue 5 ppH + 2 ppH resin | brittle | | |
| 29 | Blue 5 ppH + 4 ppH resin | brittle | | |
| 30 | Blue 5 ppH + 2 ppH untreat silica | brittle | | |
| 31 | 6.5 ppH TiO$_2$ | brittle | | |
| 32 | 8.5 ppH TiO$_2$ | brittle | | |

6. Example 6

Exemplary Compositions 1-8 and 10-15 and comparative Compositions 9 and FS3-3730 were initially evaluated raw (unbaked; only exposed to 150° C. for post-cure). The resultant tensile strength and elongation is shown below in Table 15.

TABLE 15

| No. | Thickness (in) | Tensile Strength (psi) | Elongation (%) |
|---|---|---|---|
| 1 | 0.027 | 799 | 398 |
|   | 0.016 | 591 | 335 |
|   | 0.018 | 576 | 339 |
|   | 0.02  | 640 | 374 |
|   | 0.02  | 546 | 311 |
| 2 | 0.022 | 840 | 429 |
|   | 0.023 | 794 | 407 |
|   | 0.021 | 726 | 408 |
|   | 0.022 | 575 | 320 |
|   | 0.022 | 719 | 392 |
| 3 | 0.03  | 632 | 371 |
|   | 0.029 | 752 | 386 |
|   | 0.026 | 357 | 244 |
|   | 0.022 | 668 | 376 |
|   | 0.021 | 707 | 385 |
| 4 | 0.028 | 726 | 399 |
|   | 0.027 | 441 | 288 |
|   | 0.03  | 653 | 194 |
|   | 0.028 | 748 | 397 |
|   | 0.033 | 730 |     |
| FS3-3730 | 0.026 | 698 | 78 |
|   | 0.026 | 665 | 389 |
| 6 | 0.028 | 506 | 339 |
|   | 0.027 | 520 | 346 |
| 7 | 0.034 | 603 | 452 |
|   | 0.029 | 593 | 428 |
|   | 0.031 | 532 | 396 |
|   | 0.03  | 579 | 444 |
|   | 0.031 | 603 | 437 |
| 8 | 0.032 | 571 | 450 |
|   | 0.028 | 562 | 454 |
|   | 0.029 | 523 | 439 |
|   | 0.032 | 561 | 470 |
|   | 0.029 | 611 | 500 |
| 9 | 0.031 | 800 | 428 |
|   | 0.025 | 735 | 431 |
|   | 0.03  | 828 | 454 |
|   | 0.029 | 783 | 438 |
|   | 0.028 | 714 | 427 |
| 10 | 0.031 | 633 | 401 |
|    | 0.025 | 471 | 350 |
|    | 0.030 | 618 | 382 |
|    | 0.029 | 657 | 426 |
|    | 0.028 | 709 | 422 |
| 11 | 0.029 | 693 | 407 |
|    | 0.027 | 665 | 442 |
|    | 0.027 | 594 | 369 |
|    | 0.03  | 605 | 371 |
|    | 0.027 | 591 | 394 |
| 12 |       | 497 | 237 |
|    |       | 518 | 235 |
| 13 |       | 569 | 282 |
|    |       | 515 | 271 |
|    |       | 513 | 275 |
|    |       | 531 | 220 |
|    |       | 604 | 253 |
|    |       | 593 | 250 |
|    |       | 474 | 193 |
| 14 |       | 580 | 255 |
|    |       | 601 | 289 |
|    |       | 778 | 361 |
|    |       | 745 | 303 |
|    |       | 636 | 317 |
|    |       | 519 | 308 |
| 15 |       | 562 | 320 |
|    |       | 569 | 354 |
|    |       | 469 | 311 |
|    |       | 508 | 321 |
|    |       | 436 | 283 |
| FS3-3730 |   | 785 | 298 |
|    |       | 716 | 277 |
|    |       | 525 | 228 |
|    |       | 711 | 263 |
|    |       | 697 | 313 |

Exemplary Compositions 1-8 were then baked at 316° C. for 30 minutes, before being re-evaluated for tensile strength and elongation (see Table 16).

TABLE 16

| No. | Tensile Strength (psi) | Elongation (%) |
|---|---|---|
| 1 | 339 | 367 |
|   | 251 | 257 |
|   | 123 | 170 |
|   | 198 | 227 |
|   | 301 | 302 |
| 2 | 248 | 297 |
|   | 304 | 372 |
|   | 417 | 407 |
|   | 145 | 274 |
|   | 367 | 392 |
| 3 | 369 | 404 |
|   | 308 | 338 |
|   | 334 | 376 |
|   | 321 | 401 |
|   | 397 | 407 |
| 4 | 409 | 415 |
|   | 332 | 327 |
|   | 103 | 101 |
|   | 421 | 444 |
|   | 394 | 429 |
| 5 | 398 | 452 |
|   | 468 | 470 |
|   | 354 | 364 |
|   | 496 | 473 |
| 6 | 358 | 462 |
|   | 369 | 416 |
|   | 374 | 437 |
|   | 284 | 384 |
|   | 353 | 440 |
| 7 | 295 | 527 |
|   | 206 | 350 |
|   | 331 | 540 |
|   | 214 | 352 |
|   | 281 | 411 |
| 8 | 230 | 557 |
|   | 257 | 539 |
|   | 266 | 507 |
|   | 216 | 446 |
|   | 304 | 518 |

Exemplary Compositions 9-16 were baked at 316° C. for the indicated time and then re-evaluated for tensile strength and elongation as shown in Table 17.

TABLE 17

| No. | 316° C. | Tensile Strength (psi) | Elongation (%) |
|---|---|---|---|
| 9 | After 15 min | 102 | 41 |
|   |              | 110 | 39 |
|   | After 30 min | 84  | 10 |
|   |              | 87  | 24 |
|   | After 50 min | 59  | 17 |
|   |              | 85  | 15 |
|   |              | 57  | 22 |
|   | After 90 min | Untestable | |
|   | After 180 min | Untestable | |
| 10 | After 15 min | Untestable | |
|   | After 30 min | Untestable | |
|   | After 50 min | Untestable | |
|   | After 90 min | Untestable | |
|   | After 180 min | Untestable | |
| 11 | After 15 min | 26 | 25 |
|   | After 30 min | Untestable | |
|   | After 50 min | | |
|   | After 90 min | Untestable | |
|   | After 180 min | Untestable | |
| 12 | After 15 min | 63  | 18 |
|   |              | 104 | 34 |
|   |              | 96  | 32 |
|   | After 30 min | 53  | 100 |
|   |              | 10  | 116 |
|   |              | 49  | 11 |
|   | After 50 min | Untestable | |
|   | After 90 min | Untestable | |
|   | After 180 min | Untestable | |
| 13 | After 15 min | 194 | 172 |
|   |              | 454 | 183 |
|   |              | 255 | 175 |
|   | After 30 min | 103 | |
|   |              | 101 | |
|   |              | 118 | |
|   | After 50 min | Untestable | |
|   | After 90 min | 11 | 116 |
|   | After 180 min | Untestable | |
| 14 | After 15 min | Untestable | |
|   | After 30 min | Untestable | |
|   | After 50 min | Untestable | |
|   | After 90 min | Untestable | |
|   | After 180 min | Untestable | |
| 15 | After 15 min | Untestable | |
|   | After 30 min | Untestable | |
|   | After 50 min | Untestable | |
|   | After 90 min | Untestable | |
|   | After 180 min | Untestable | |
| 16 | After 15 min | 111 | 29 |
|   |              | 85  | 20 |
|   | After 30 min | 78  | 21 |
|   | After 50 min | 10  | 114 |
|   | After 90 min | Untestable | |
|   | After 180 min | Untestable | |

Exemplary Compositions 16-22, 25-29, and 31-32 were evaluated as raw (unbaked) samples only (see Table 18). Samples that were exposed to 316° C. for 30 minutes were too severely degraded to test.

TABLE 18

| No. | Tensile Strength (psi) | Elongation (%) |
|---|---|---|
| 16 | 696 | 412 |
|   | 669 | 366 |
|   | 488 | 332 |
| 17 | 763 | 424 |
|   | 561 | 367 |
|   | 537 | 349 |
| 18 | 578 | 260 |
|   | 274 | 208 |
|   | 420 | 243 |
| 19 | 422 | 242 |
|   | 471 | 261 |
|   | 600 | 290 |
| 20 | 486 | 324 |
|   | 245 | 294 |
|   | N/A | N/A |
| 21 | 288 | 244 |
|   | 300 | 234 |
|   | 382 | 288 |
| 22 | 745 | 364 |
|   | 680 | 340 |
|   | 485 | 258 |
| 25 | 382 | 249 |
|   | 523 | 318 |
|   | 468 | 269 |
| 26 | 396 | 299 |
|   | 373 | 258 |
|   | 543 | 321 |
| 27 | 562 | 342 |
|   | 534 | 326 |
|   | 516 | 324 |
| 28 | 474 | 264 |
|   | 450 | 238 |
|   | 426 | 236 |
| 29 | 419 | 242 |
|   | 394 | 248 |
|   | 369 | 218 |
| 31 | 789 | 427 |
|   | 648 | 406 |
|   | 668 | 408 |
| 32 | 601 | 375 |
|   | 544 | 356 |
|   | 507 | 352 |

What is claimed is:

1. A composition comprising:
    a) 100 parts by weight of a fluorosilicone;
    b) from about 2 to about 20 parts by weight of a silicon-based crosslinker;
    c) from about 0.1 to about 40 parts by weight of a first non-reactive spacer filler;
    d) from about 0.1 to about 40 parts by weight of a second filler comprising one or more silanol groups; and
    e) from about 0.01 to about 5 parts by weight of a curing catalyst,
    wherein a weight ratio of the first non-reactive spacer filler to the second filler comprising one or more silanol groups is from about 1:0.5 to about 1:7.

2. The composition of claim 1, wherein the composition has a tensile strength of at least 200 psi after being exposed to 600° F. in air for 60 minutes.

3. The composition of claim 1, wherein the composition has a tensile strength of at least 350 psi after being exposed to 600° F. in air for 30 minutes.

4. The composition of claim 1, wherein the composition has an elongation of at least 300% after being exposed to 600° F. in air for 30 minutes.

5. The composition of claim 1, wherein the fluorosilicone comprises a perfluoroalkyl polydiorganopolysiloxane.

6. The composition of claim 1, wherein the fluorosilicone comprises (3,3,3-trifluoropropyl)organosiloxane units.

7. The composition of claim 1, wherein the silicon-based crosslinker comprises an alkoxysilicon compound, an acetoxysilicon compound, a ketoximosilicon compound, or a combination thereof.

8. The composition of claim 1, wherein the first non-reactive spacer filler is a carbon black, graphite, graphene, a pigment, quartz, a carbon nanotube, or combination thereof.

9. The composition of claim 1, wherein the second filler comprising one or more silanol groups is silica.

10. The composition of claim 1, wherein the curing catalyst is selected from the group consisting of lead naphthenate, cobalt naphthenate, zinc naphthenate, sodium naphthenate, iron-2-ethylhexoate, lead 2-ethylhexoate, chromium octoate, dibutyltin dibenzoate, dibutyltin adipate, lead sebacate, dibutyltin dilactate, dibutyltindiacetate, dibutyltindilaurate, lead octoate, tin ricinoleate, cobalt hexoate, aluminum acetyl-acetonate, zirconium acetoacetate, dioctyltindimaleinate, dibutyltin diacetate, and stannous octoate, or a combination thereof.

11. The composition of claim 1, wherein the composition comprises
a) 100 parts by weight of a fluorosilicone;
b) from about 3 to about 10 parts by weight of a silicon-based crosslinker;
c) from about 2 to about 8 parts by weight of a first non-reactive spacer filler;
d) from about 8 to about 14 parts by weight of a second filler comprising one or more silanol groups; and
e) from about 0.03 to about 0.15 parts by weight of a curing catalyst.

12. The composition of claim 1, wherein the composition comprises
a) 100 parts by weight of a fluorosilicone;
b) from about 3 to about 10 parts by weight of a silicon-based crosslinker;
c) from about 2 to about 8 parts by weight of carbon black;
d) from about 8 to about 14 parts by weight of fumed silica; and
e) from about 0.03 to about 0.15 parts by weight of a curing catalyst.

13. A method comprising the steps of:
a) applying the composition of claim 1 to a surface; and
b) curing the applied composition.

14. A composition comprising:
a) 100 parts by weight of a fluorosilicone;
b) from about 2 to about 20 parts by weight of a silicon-based crosslinker;
c) a first amount of a first non-reactive spacer filler;
d) a second amount of a second filler comprising one or more silanol groups; and
e) from about 0.01 to about 5 parts by weight of a curing catalyst,
wherein the composition has a tensile strength of at least 200 psi after being exposed to 600° F. in air for 60 minutes,
wherein a weight ratio of the first non-reactive spacer filler to the second filler comprising one or more silanol groups is from about 1:0.5 to about 1:7.

15. The composition of claim 14, wherein the composition has an elongation of at least 300% after being exposed to 600° F. in air for 30 minutes.

16. A kit comprising:
a) 100 parts by weight of a fluorosilicone;
b) from about 2 to about 20 parts by weight of a silicon-based crosslinker;
c) from about 0.1 to about 40 parts by weight of a first non-reactive spacer filler;
d) from about 0.1 to about 40 parts by weight of a second filler comprising one or more silanol groups; and
e) from about 0.01 to about 5 parts by weight of a curing catalyst; and
f) a container containing parts a)-e),
wherein a weight ratio of the first non-reactive spacer filler to the second filler comprising one or more silanol groups is from about 1:0.5 to about 1:7.

17. A composition comprising
a) 100 parts by weight of a fluorosilicone;
b) from about 2 to about 16 parts by weight of a first non-reactive spacer filler;
c) from about 0.03 to about 0.15 parts by weight of a curing catalyst;
d) from about 0.1 to about 20 parts by weight of a silanol resin and/or an untreated silica;
e) from about 3 to about 10 parts by weight of a silicon-based crosslinker; and
f) from about 8 to about 14 parts by weight of a second filler comprising one or more silanol groups,
wherein a weight ratio of the first non-reactive spacer filler to the second filler comprising one or more silanol groups is from about 1:0.5 to about 1:7.

18. The composition of claim 17, wherein the first non-reactive spacer filler is carbon black or a pigment, and wherein the second filler is fumed silica.

19. A method comprising the steps of:
a) applying the composition of claim 17 to a surface; and
b) curing the applied composition.

* * * * *